(12) United States Patent
Frumkin et al.

(10) Patent No.: US 11,294,205 B2
(45) Date of Patent: Apr. 5, 2022

(54) THERMALLY-ACTUATED DEVICES AND USE THEREOF

(71) Applicant: TECHNION RESEARCH & DEVELOPMENT FOUNDATION LIMITED, Haifa (IL)

(72) Inventors: Valeri Frumkin, Pardes-Hanna (IL); Moran Bercovici, Haifa (IL); Shimon Rubin, Haifa (IL); Carmel Rotschild, Ganey Tikva (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 136 days.

(21) Appl. No.: 16/496,443

(22) PCT Filed: Mar. 22, 2018

(86) PCT No.: PCT/IL2018/050335
§ 371 (c)(1),
(2) Date: Sep. 22, 2019

(87) PCT Pub. No.: WO2018/173065
PCT Pub. Date: Sep. 27, 2018

(65) Prior Publication Data
US 2020/0096794 A1    Mar. 26, 2020

Related U.S. Application Data

(60) Provisional application No. 62/475,096, filed on Mar. 22, 2017, provisional application No. 62/474,903, filed on Mar. 22, 2017.

(51) Int. Cl.
*G02F 1/01* (2006.01)

(52) U.S. Cl.
CPC .................. *G02F 1/01* (2013.01)

(58) Field of Classification Search
CPC ........... G02F 1/01; G02F 1/009; G02F 1/0147
See application file for complete search history.

(56) References Cited

PUBLICATIONS

Tobias Baier et al., "Thermocapillary flow on superhydrophobic surfaces", Mar. 2010, Physical Review E, vol. 3, Issue 82, p. 337301-1 to 337301-4.*

(Continued)

*Primary Examiner* — Joseph P Martinez
(74) *Attorney, Agent, or Firm* — The Roy Gross Law Firm, LLC; Roy Gross

(57) ABSTRACT

Disclosed herein is a device comprised of: i) at least one substrate; (ii) a ceiling; (iii) one or more flow channels disposed between said substrate and said ceiling and configured to contain an actuation liquid; and (iv) one or more recesses distributed throughout at least said substrate and open to said flow channel and configured to contain a fluid; wherein 50% to 80% of the flow channel liquid-substrate interface, interfaces with said fluid within said recesses; and (v) at least one heating element, configured to heat one or more portions of the actuation liquid and generate a pressure and/or temperature gradient within said actuation liquid. Systems and uses of the device are further disclosed.

18 Claims, 23 Drawing Sheets

(56) References Cited

PUBLICATIONS

Valeri Frumkin, Alexander Oron, "Liquid film flow along a substrate with an asymmetric topography sustained by the thermocapillary effect", Physics of Fluids, vol. 8 Issue 28 p. 082107, 2016.
Tobias Baier et al., "Thermocapillary flow on superhydrophobic surfaces", Physical Review E, vol. 3 Issue 82 p. 037301, 2010.
Tobias Baier et al., "Numerical modelling of thermocapillary flow on superhydrophobic surfaces",14th International Conference on Miniaturized Systems for Chemistry and Life Sciences (MicroTAS), Groningen, The Netherlands, pp. 3-7, Oct. 2010.
Richard D. Lenz, Satish Kumar, "Steady two-layer flow in a topographically patterned channel", Physics of Fluids, vol. 10 Issue 19 p. 102103, 2007.
Vincent Studer et al., "Scaling properties of a low-actuation pressure microfluidic valve", Journal of Applied Physics, vol. 1 Issue 95 pp. 393-398, 2004.
K. Ono et al., "Optofluidic tweezer on a chip", Biomicrofluidics, vol. 4 Issue 4 p. 043012, 2010.
Kihwan Choi et al., "Digital Microfluidics" Annual Review of Analytical Chemistry, vol. 5 pp. 413-440, 2012.
James Thomson, "On certain curious motions observable at the surfaces of wine and other alcoholic liquors" The London, Edinburgh, and Dublin Philosophical Magazine and Journal of Science, Series 4 pp. 330-333, 1855.
Stephen H. Davis, "Thermocapillary instabilities", Annual Review of Fluid Mechanics, vol. 9 pp. 403-435, 1987.
Shashi Thutupalli et al., "Swarming behavior of simple model squirmers", New Journal of Physics vol. 7 Issue 13 p. 073021, 2011.
Maximilian Schmitt, Holger Stark, "Marangoni flow at droplet interfaces: Three-dimensional", Physics of Fluids, vol. 1 Issue 28 p. 012106, 2016.
J. R. A. Pearson, "On convection cells induced by surface tension", Journal of Fluid Mechanics, vol. 4 Issue 5 pp. 489-500, 1958.
Alex Oron et al., "Long-scale evolution of thin liquid films", Reviews of Modern Physics, vol. 3 Issue 69 pp. 931-980, 1997.
Timothy S. Sammarco, Mark A. Burns, "Thermocapillary pumping of discrete drops in microfabricated analysis devices", American Institute of Chemical Engineers Journal, vol. 45 Issue 2 pp. 350-366, 1999.
Amar S. Basu, Yogesh B. Gianchandani, "Virtual microfluidic traps, filters, channels and pumps using Marangoni flows", Journal of Micromechanics and Microengineering, vol. 18 No. 11 p. 115031, 2008.
G. Karapetsas et al., "Thermocapillary Droplet Actuation: Effect of Solid Structure and Wettablitiy", Langmuir, vol. 41 Issue 33 p. 10838-10850, 2017.
A. D. Stroock et al., "Fluidic Ratchet Based on Marangoni-Bénard Convection", Langmuir, vol. 19 pages Issue 10 4358-4362, 2003.
A. B. D. Cassie and S. Baxter, "Wettablity of porous surfaces", Royal Society of Chemistry, Transactions of the Faraday Society, vol. 40 pp. 546-551, 1944.
John R. Philip, "Flows satisfying mixed no-slip and no-shear conditions", Zeitschrift für angewandte Mathematik und Physik ZAMP, vol. 23 Issue 3 pegs 353-372, 1972.
David Ross et al., "Temperature Measurement in Microfluidic Systems Using a Temperature-Dependent Fluorescent Dye", Analytical Chemistry, vol. 73 Issue 17 pp. 4117-4123, 2001.
Juan G. Santiago, "A particle image velocimetry system for microfluidics", Experiments in Fluids, vol. 25 Issue 4 pp. 316-319, 1998.
Carl D. Meinhart, "PIV measurements of a microchannel flow", Experiments in Fluids, vol. 27 pp. 414-419, 1999.
Shimon Rubin et al., "Elastic deformations driven by non-uniform lubrication flows", Journal of Fluid Mechanics, vol. 812 pp. 841-865, 2017.
Hongyao Geng et al., "Dielectrowetting manipulation for digital microfluidics: creating, transporting, splitting, and merging of droplets", Lab on Chip, vol. 17 pp. 1060-1068, 2017.
Yanfen Zheng et al., "Droplet Motion on a Shape Gradient Surface", Langmuir, vol. 33 Issue 17 pp. 4172-4177, 2017.
Manu Prakash and N. Gershenfeld, "Microfluidic bubble logic," Science, vol. 315 Issue 5813 pp. 832-835, 2007.
Shia-Yen Teh et al., "Droplet microfluidics", Lab Chip, vol. 8 No. 2 pp. 198-220, 2008.
Michael J. Fuerstman et al., "Coding/decoding and reversibility of droplet trains in microfluidic networks", Science, vol. 315 Issue 5813 pp. 828-832, 2007.
Irving R. Epstein, "Can droplets and bubbles think?", Science, vol. 315 Issue 5813 pp. 775-776, 2007.
Elena M. Luccheta et al., "Characterization of the local temperature in space and time around a developing *Drosophila* embryo in a microfluidic device", Lab Chip, vol. 6 Issue 2 p. 185-190, 2006.
Noo Li Jeon et al., "Neutrophil chemotaxis in linear and complex gradients of interleukin-8 formed in a microfabricated device", Nature Biotechnology, vol. 20 pp. 826-830, 2002.
Lih Feng Cheow, "Digital microfluidics: Droplet based logic gates", Applied Physics Letters, vol. 90 Issue 5 p. 054107, 2007.
Junghoon Lee, Chang-Jin Kim, "Surface-tension-driven microactuation based on continuous electrowettin", J. Journal of Microelectromechanical Systems, vol. 9 Issue 2 pp. 171-180, 2000.
Pei-Yu Chiou et al., "Droplet manipulation with light on optoelectrowetting device", Journal of Microelectromechanical Systems, vol. 17 Issue 1 pp. 133-138, 2008.
Arthur Ashkin, "Acceleration and Trapping of Particles by Radiation Pressure", Physical Review Letters, vol. 24 Issue 4 pp. 156-159, 1970.
Gary Wells, "Diffraction grating with suppressed zero order fabricated using dielectric forces", Optics Letters, vol. 36 Issue 22 pp. 4404-4406, 2011.
International Search Report of PCT/IL2018/050335 Completed Jul. 11, 2018; dated Jul. 16, 2018 2 pages.
Written Opinioin of PCT/IL2018/050335 Completed Jul. 11, 2018; dated Jul. 16, 2018 5 pages.

\* cited by examiner

Side view

Top view

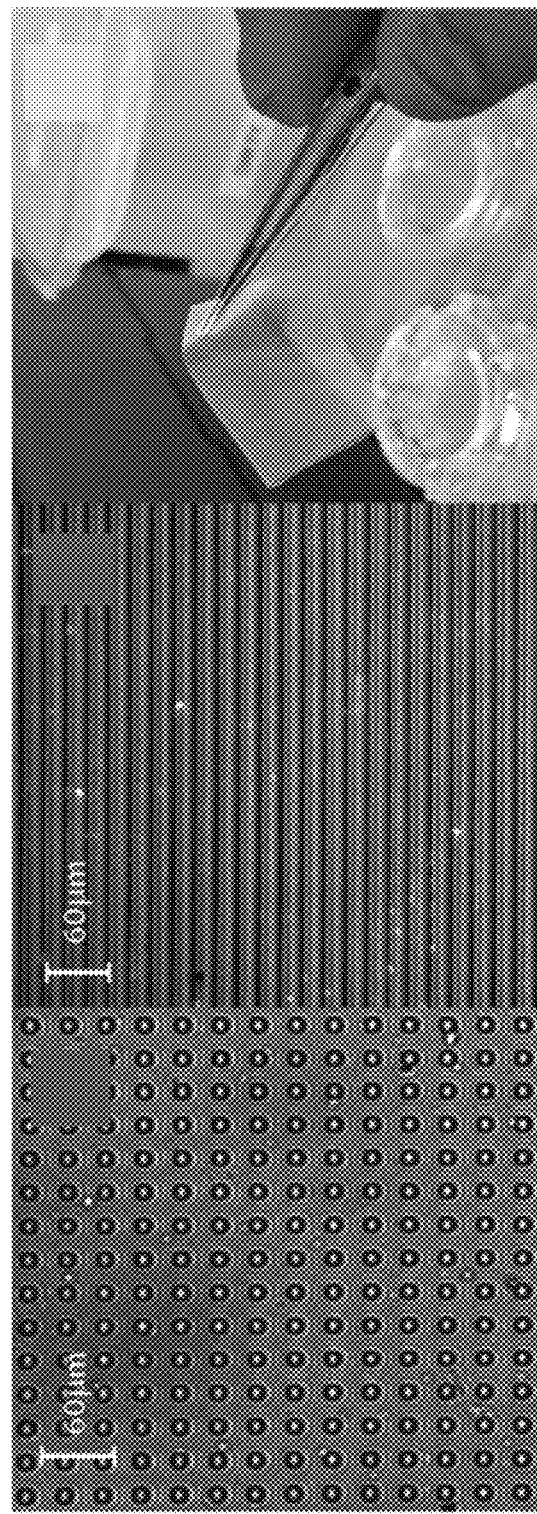

THERMALLY-ACTUATED DEVICES AND USE THEREOF

CROSS-REFERENCE TO RELATED APPLICATIONS

This application is a National Phase of PCT Patent Application No. PCT/IL2018/050335 having International filing date of Mar. 22, 2018, which claims the benefit of priority from U.S. Provisional Patent Applications Nos. 62/474,903 and 62/475,096, both filed on Mar. 22, 2017. The content of the above documents is incorporated by reference in their entirety as if fully set forth herein.

FIELD OF INVENTION

The present invention is in the field of thermally-actuated devices and uses thereof.

BACKGROUND OF THE INVENTION

Using current technologies, a microfluidic chip-based microchannel network is usually a one-time rigid confinement tailored towards a specific application, and cannot be reconfigured or adapted if the application changes. Some degrees of freedom can be added using on-chip valves (most often implemented by hydraulic actuators, e.g. "Quake valves") allowing the flow path within an existing network to be modified.

Furthermore, some technologies allow manipulation of objects within the fluid (e.g. beads or cells) or discrete droplets, however there are no established technologies for arbitrarily controlling and manipulating the flow field within microdevices. Such a technology, with its additional degrees of freedom, has the potential to open the door to wide range of new on-chip applications.

SUMMARY OF THE INVENTION

The present invention provides, in some embodiments thereof, thermally-actuated devices and uses thereof.

According to an aspect of some embodiments of the present invention there is provided a device comprising: (i) at least one substrate; (ii) a ceiling; (iii) one or more flow channels disposed between said substrate and said ceiling and configured to contain an actuation liquid; (iv) one or more recesses distributed throughout at least the substrate and open to the flow channel and configured to contain a fluid; wherein 50% to 80% of the flow channel liquid-substrate interface, interfaces with the fluid within the recesses, and (v) at least one heating element, configured to heat one or more portions of the actuation liquid and generate a temperature gradient within the actuation liquid.

In some embodiments, at least one of the flow channels is interposed between the substrate and the ceiling layer.

In some embodiments, the recesses are microsized.

In some embodiments, the temperature wherein said temperature gradient generates create a pressure distribution or a velocity field in the actuation liquid, e.g., along a path of the flow channel.

In some embodiments, the device is in the form of a closed chamber.

In some embodiments, the fluid is gas.

In some embodiments, the fluid is liquid characterized by a viscosity of up to 100 Cp.

In some embodiments, the liquid is characterized by a viscosity of 0.1 Cp to 100 Cp.

In some embodiments, the fluid is characterized by an interfacial tension of 0.1 mN/m to 75 mN/m.

In some embodiments, the liquid is characterized by a thermal conductivity of 0.015 W/mK to 0.3 W/mK.

In some embodiments, the substrate is characterized by a thermal conductivity of 0.015 W/mK to 2 W/mK.

In some embodiments, a vertical distance between the ceiling and the substrate is 5 μm to 1 cm.

In some embodiments, the recesses are characterized by a depth of 5 to 100 μm.

In some embodiments, a volume of the recesses varies within less than ±30%.

In some embodiments, at least one substrate is characterized by a thickness of 100 to 1000 μm.

In some embodiments, the substrate is superhydrophobic. In some embodiments, the substrate is characterized by a static water contact angle of at least 100°.

In some embodiments, the superhydrophobic substrate comprises a material selected from the group consisting of: silicon, glass, Poly(dimethylsiloxane) (PDMS), parylene, Poly(methylmethacrylate), polyethylene, and any combination thereof.

In some embodiments, the ceiling comprises a superhydrophobic material.

In some embodiments, the actuation liquid comprises a Newtonian liquid.

In some embodiments, the liquid comprises a non-Newtonian liquid.

In some embodiments, the actuation liquid comprises light-absorbing particles, characterized by a light absorbance efficiency of at least 1%. In some embodiments, the substrate has attached thereto light-absorbing particles, characterized by a light absorbance efficiency of at least 1%.

In some embodiments, the recesses (e.g., the micro-sized recesses) contain gas, in some embodiments, wherein the recesses are substantially devoid of liquid.

In some embodiments, the heating element is a plurality of electrodes, disposed proximately to an interface of the flow channel on the substrate. In some embodiments, the flow channel has a width of between 50 um to 5 cm.

In some embodiments, the heating element is an illumination means.

In some embodiments, the ceiling layer or the substrate comprises a plate having one or more transparencies configured to allow light to shine through in a defined pattern.

In some embodiments, the ceiling layer or the substrate comprises a film or a plate characterized by light absorbance over a defined range of wavelengths. In some embodiments, the range of wavelengths is selected from the infra-red (IR) spectrum, the visible spectrum, or in the ultraviolet (UV) spectrum.

In some embodiments, the ceiling layer comprises an elastic sheet.

In some embodiments, the elastic sheet is characterized by $E*h^3$ having a value of $10^{-13}$ to $10^{-9}$ N*m, wherein "E" is Young's modulus of the membrane, and "h" is a thickness of the membrane.

In some embodiments, the elastic sheet is in fluid communication with the actuating liquid and is configured to deform in response to a flow of the actuating liquid.

According to another aspect, there is provided a system comprising the disclosed device in an embodiment thereof.

In some embodiments, the system further comprises a control unit configured to provide a predetermined and/or variable heat toward one or more regions of the actuation liquid.

According to another aspect, there is provided a method comprising the steps of:
  (a) providing a device having: (i) at least one substrate; (ii) a ceiling; (iii) one or more flow channels disposed between said substrate and said ceiling containing an actuation liquid; one or more recesses distributed throughout at least said substrate and open to said flow channel and containing a fluid; wherein 50% to 80% of the flow channel liquid-substrate interface, interfaces with said fluid within said recesses; and
  (b) providing thermal energy to a portion of the actuation liquid so as to establish a temperature gradient to the liquid, thereby generating pressure distribution or a velocity field in the actuation liquid. In some embodiments, the ceiling layer has an elastic film, and the pressure distribution of the actuating liquid deforms a defined region of the elastic film upon providing thermal energy.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

FIGS. 6A-F present experimental results showing superhydrophobic structures fabricated: bright field microscopy images of superhydrophobic structures in PDMS, including aligned posts, staggered posts, and trenches at different magnifications (FIGS. 6A-D); thin PDMS membrane fabricated with one superhydrophobic side, allowing close proximity of the heating elements to the liquid surface (FIG. 6E); bright field image of a droplet on our pillar-based superhydrophobic membrane, exhibiting a high contact angle (FIG. 6F).

DETAILED DESCRIPTION OF THE INVENTION

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The Device

The present invention provides, in some embodiments thereof, a device (also referred to hereinthroughout as "chip" or "device 100") being in the form of multiple stacked layers (also referred to as "sandwich structure"), the device comprising a substrate; a ceiling layer; one or more flow channels disposed on the substrate, configured to contain an actuation liquid, and wherein one or more of: the ceiling and the substrate have one or more recesses distributed throughout open or interfacing the flow channel, and configured to contain a fluid. "By distributed throughout" it is meant on at least portion thereof.

In some embodiments, the recesses are microsized.

Figure 1A:
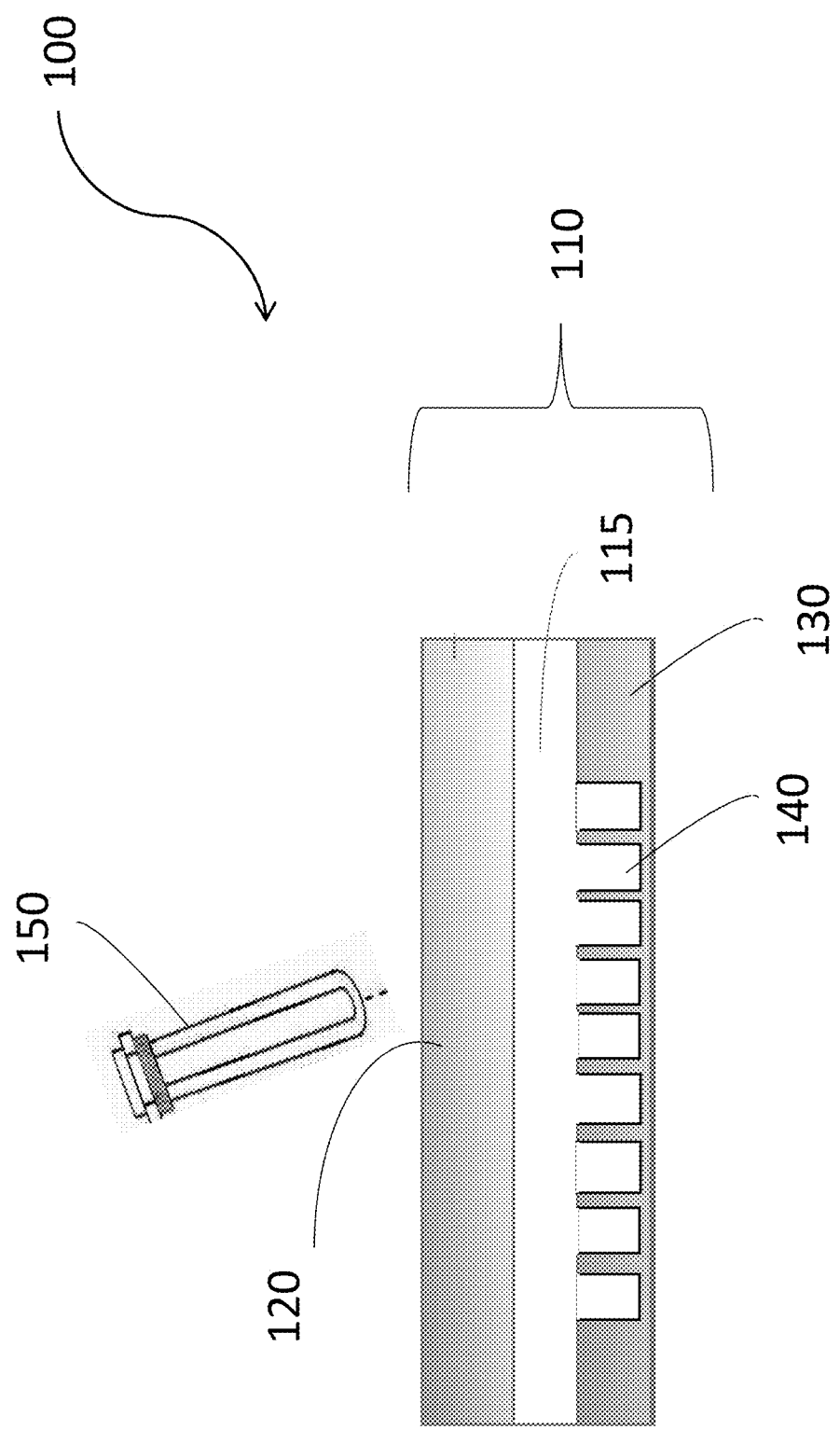
FIGS. 1A-E present non-limiting schematic illustrations of: the device 100 thereof (FIG. 1A); a side view of schematic illustration describing an exemplary device (FIG. 1B), and various exemplary configurations of liquid spacer: schematic illustration describing an spatial light modulator (SLM) device operating by local heating by radiation (FIG. 1C); a schematic sketch describing a local deformation of width w and height h which introduces a spatial phase difference due to difference of optical paths which are reflected from the deformation to other paths which do not reflect from it. For monochromatic light source with wavelength λ, deformation of height h=λ/4 introduces a phase shift of π (FIG. 1D); and a schematic illustration describing multi-layer controllable Bragg reflector (FIG. 1E).
Figure 1B:
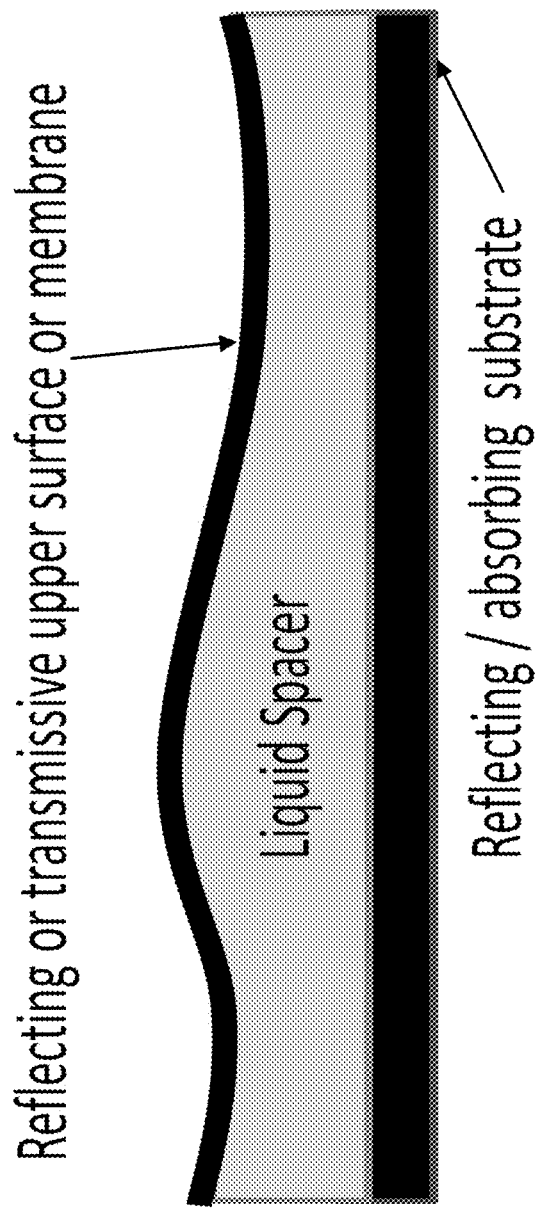
Figure 1C:
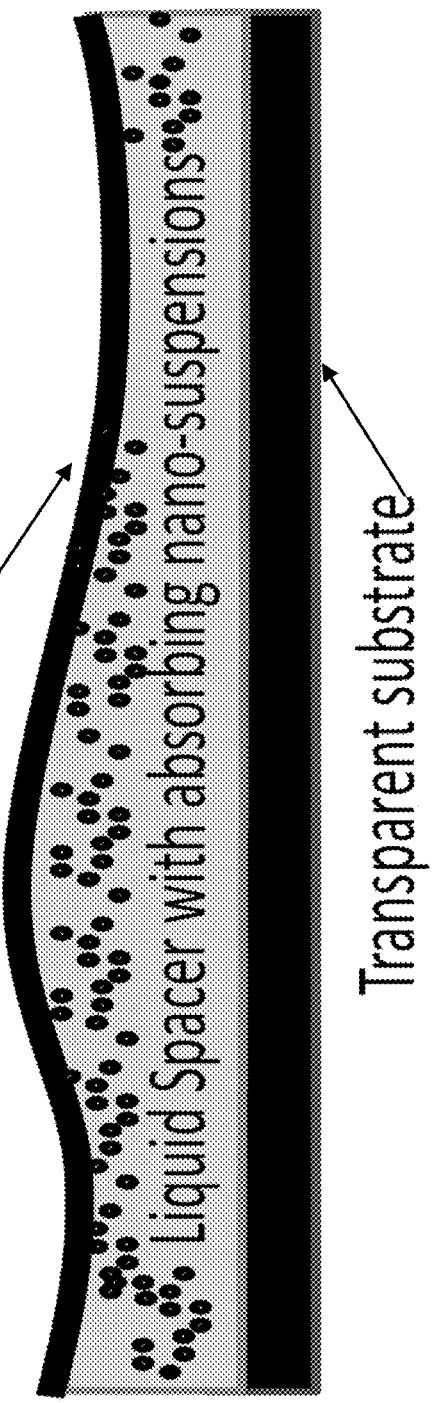
Figure 1D:
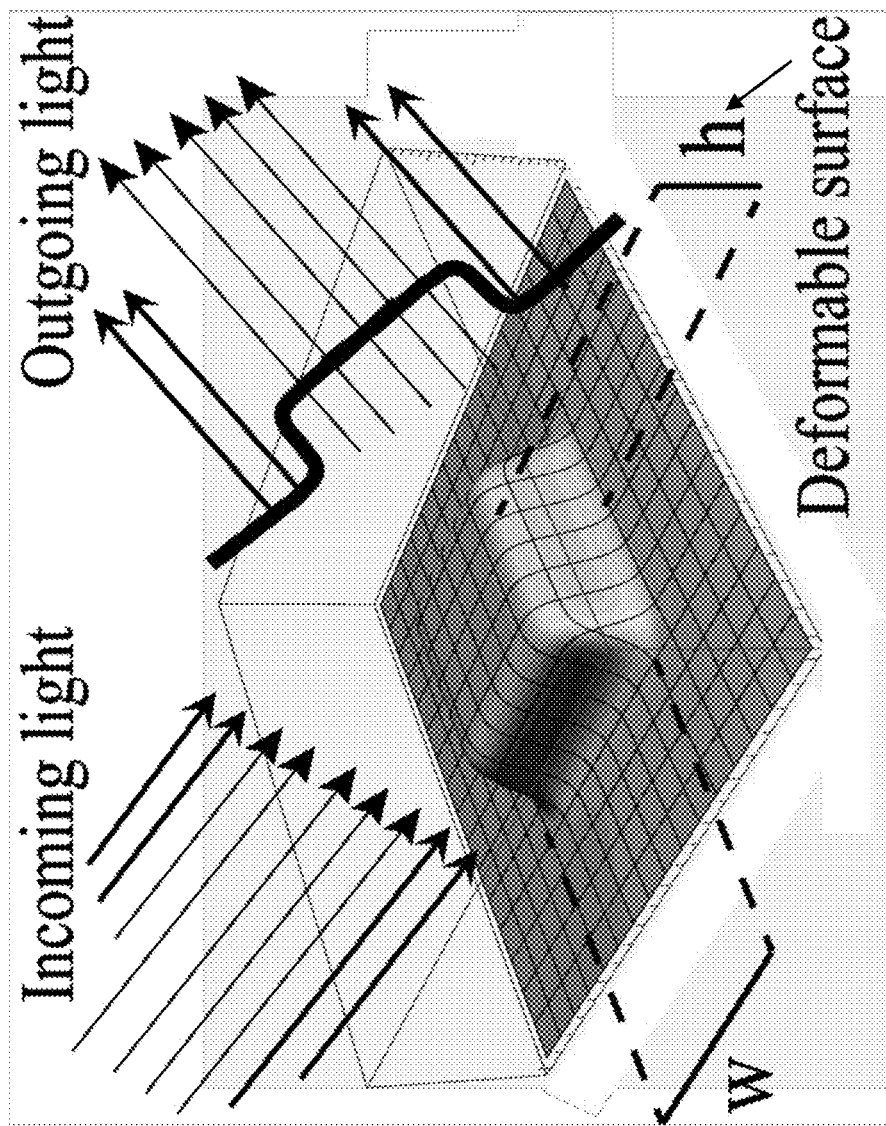

Reference is now made to FIG. 1A, which shows a perspective view and a 3D illustration, respectively, of an exemplary device 100.

Device 100 may have housing. The housing may fully encapsulate elements of device 100 and may be made of a rigid, durable material, such as aluminum, stainless steel, a hard polymer and/or the like. The housing may partially encapsulate elements of device 100. The housing may prevent unwanted foreign elements from entering device 100.

Device 100 may have (or be in) the form of a chamber 110. Device 100 may have at least one flow channel 115, as described and exemplified hereinbelow. Device 100 may have a ceiling layer 120 as described and exemplified hereinbelow. Ceiling layer 120 may be disposed atop flow channel 115.

The terms "ceiling" and "ceiling layer" are used hereinthroughout interchangeably.

Device 100 may have a substrate 130 as described and exemplified hereinbelow. Substrate 130 may have one or more recesses (e.g., micro-sized) 140 distributed therethroughout, configured to contain a fluid. Substrate 130 and one or more micro-sized recesses 140 distributed therethroughout may be disposed below flow channel 115. Device 100 may have bottom cover. Device 100 may have at least one heating element 150. Heating element 150 may selectively heat one or more portions of the actuation liquid.

Optionally, the device is designed as a closed chamber or as a closed module.

The term "closed chamber" denotes a structure having boundaries or walls configured to enclose an internal space such that the internal space is sealed off against the external environment or the open atmosphere.

Optionally, 50% to 90% of the flow channel liquid-substrate interface, interfaces with the fluid within the recesses.

Optionally, 40% to 90% of the flow channel liquid-substrate interface, interfaces with the fluid within the recesses. Optionally, 40% to 80% of the flow channel liquid-substrate interface, interfaces with the fluid within the recesses. Optionally, 50% to 80% of the flow channel liquid-substrate interface, interfaces with the fluid within the recesses. Optionally, 40%, 50%, 60%, 70%, 80%, or 90%, including any value and range therebeween of the flow channel liquid-substrate interface, interfaces with the fluid within the recesses.

Optionally, the device comprises a heating element configured to selectively heat one or more respective portions of the actuation liquid so as to generate or temperature gradient within said actuation liquid, thereby generating, for example, a pressure distribution or a velocity field in the actuation liquid, e.g., along a path of the flow channel.

The term "recess" is used to mean a hollow space on the surface of e.g., the substrate.

In some embodiments, by "recess" it is meant to refer to a recess formed within or between pillar(s).

Optionally, the one or more recesses are characterized by a depth of 5 to 100 µm.

Optionally, the recesses are characterized by a depth of 10 to 100 µm. Optionally, the recesses are characterized by a depth of 10 to 80 µm. Optionally, the recesses are characterized by a depth of 20 to 80 µm. Optionally, the recesses are characterized by a depth of 30 to 70 µm. Optionally, the recesses are characterized by a depth of 5, 10, 15, 20, 25, 30, 35, 40, 45, 50, 55, 60, 65, 70, 75, 80, 85, 90, 95, or 100 µm, including any value and range therebetween.

Optionally, the volumes of the recesses are uniform. In some embodiments, by "uniform" it is meant that the volume of the recesses varies within less than ±50%. In some embodiments, by "uniform" it is meant that the volume of the recesses varies within less than ±40%. In some embodiments, by "uniform" it is meant that the volume of the recesses varies within less than ±30%. In some embodiments, by "uniform" it is meant that the volume of the recesses varies within less than ±20%.

The term "sandwich structure" refers to an essentially layered arrangement of the substrate a flow channel(s), a substrate and a ceiling layer.

Figure 9A:
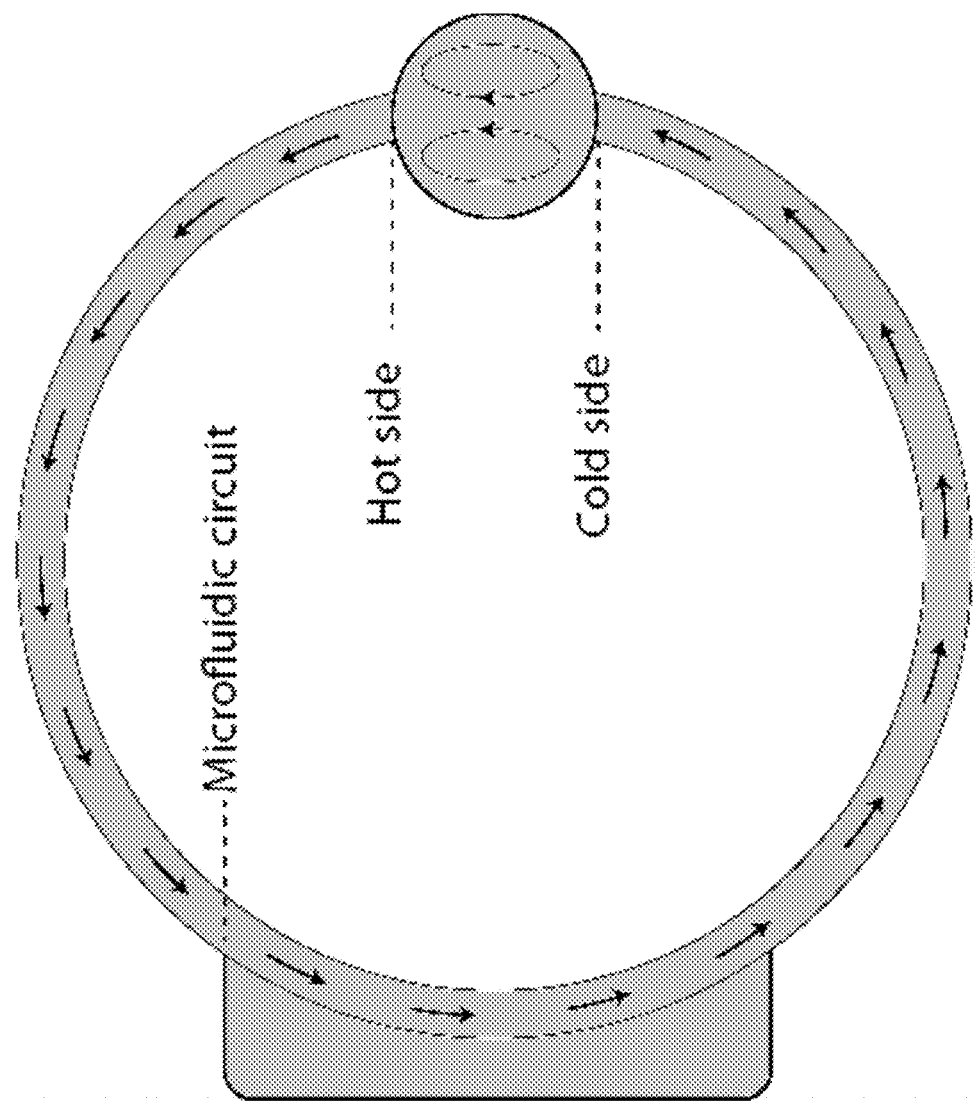
FIGS. 9A-C present reservoir-driven thermocapillary flow: schematic illustration of a reservoir driven flow concept (FIG. 9A); and experimental results showing thermocapillary flow in an open reservoir, driving liquid through a hydrophilic channel: an open reservoir filled with a shallow layer of liquid is connected to a microfluidic channel: subjecting the reservoir to a temperature gradient gives rise to dipole flow characterized by elevated and reduced pressures at its poles and this pressure gradient drives the flow in the rest of the (non-hydrophobic) channel (FIGS. 9B and C).
Figure 9B:
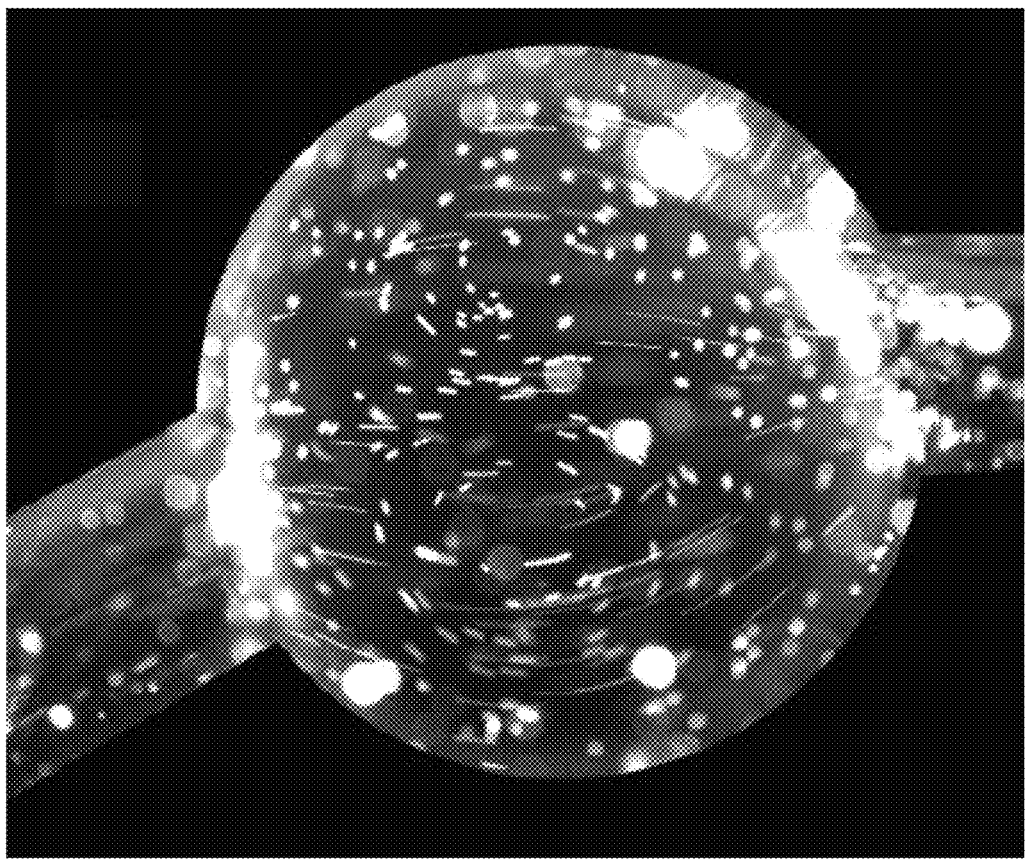
Figure 9C:
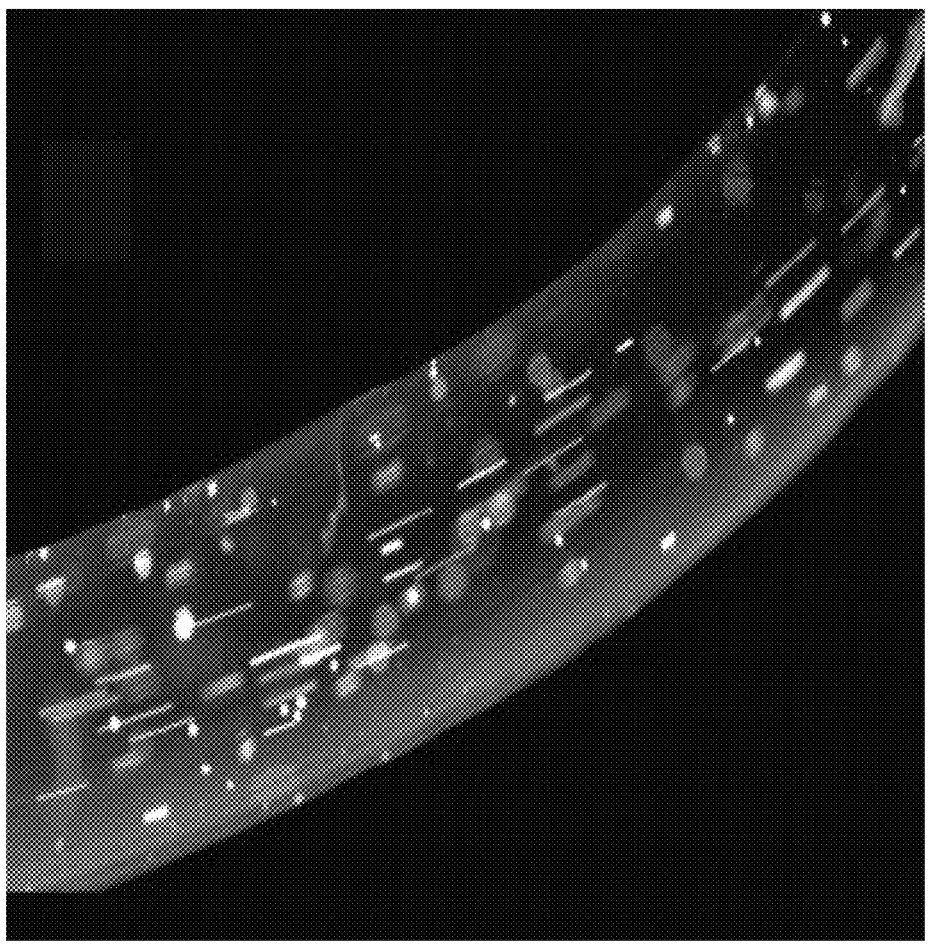

Optionally, the device has one recess, and a portion of a ceiling layer is elevated, such that the elevated ceiling layer aligned to the recess so as to form a reservoir, as shown in FIGS. 9A-C.

In some embodiments, the ceiling layer, the flow channels and the substrate are substantially parallel to each other.

The term "substantially parallel" means that the axes of at least part of the actuation liquid and deformable plate are parallel within a range of less than ±30 degrees.

Optionally, the substrate is in fluid communication with a flow channel(s). Optionally, the flow channel(s) is in fluid communication with a ceiling.

In some embodiments, the ceiling layer is deposited atop of a flow channel.

As used hereinthroughout, the term "fluid communication" means fluidically interconnected, and refers to the existence of a continuous coherent flow path from one of the components of the system to the other if there is, or can be established, liquid and/or gas flow through and between the ports, when desired, to impede fluid flow therebetween.

Optionally, at least one of the flow channels is interposed between the substrate and the ceiling layer.

The term "atop" as used herein is not restricted to a particular orientation with respect to the gravitational field of the local environment, but simply refers to one element being disposed on another element, optionally with one or more intermediate elements disposed therebetween, unless otherwise indicated. Thus, a first element may be "atop" a second element even if the first element is disposed on a "bottom" (from the standpoint of gravity) surface of the second element.

The term "microsized" refers to features of the structure having at least one physical dimension, such as a cross sectional dimension or longitudinal dimension (e.g., width, height, length, or diameter), that that is within the range of 1 micron to 1000 microns.

The term "fluid" may refer to gaseous fluid or to liquid fluid. The term "gaseous fluid" is used to define a gaseous substance, for example air, oxygen, or other gas as would be readily understood by a worker skilled in the art. A gaseous fluid may comprise therein suspended solid or semi solid material.

The term "liquid fluid" is used to define a liquid substance, for example water, oil, or other liquid as would be readily understood by a worker skilled in the art. A liquid fluid may comprise therein suspended solid or semi solid material.

In some embodiments, the liquid is a Newtonian liquid. As used herein and in the art, Newtonian liquid is a fluid in which the viscous stresses arising from its flow, at every point, are linearly proportional to the local strain rate—the rate of change of its deformation over time. In some embodiments, the liquid is a non-Newtonian liquid.

Exemplary non-Newtonian liquids are selected from, but are not limited to, Poly(acrylic acid) (PAA), carboxymethyl cellulose (CMC), or a combination thereof.

In some embodiments, the actuation liquid comprises both a Newtonian fluid and a non-Newtonian fluid.

In some embodiments, the fluid is characterized by an interfacial tension of 0.1 to 75 mN/m, 1 to 50 mN/m, or 1 to 25 mN/m.

In some embodiments, the fluid is characterized by an interfacial tension of 0.1, 1, 5, 10, 15, 20, 25, 30, 35, 40, 45, 50, 55, 60, 65, 70, or 75 mN/m, including any value and range therebetween.

In some embodiments, the term "interfacial tension" refers to the energy of a liquid-liquid interface, and quantitatively describes the tendency of a liquid to minimize its interfacial area.

In some embodiments, the flow channel comprises a liquid characterized by a conductivity of 0.015 to 0.3 W/mK. In some embodiments, the flow channel comprises a liquid characterized by a conductivity of 0.1 to 0.3 W/mK. In some embodiments, the flow channel comprises a liquid characterized by a conductivity of 0.015 to 0.2 W/mK.

In some embodiments, the flow channel comprises a liquid characterized by a conductivity of 0.015, 0.03, 0.045, 0.06, 0.075, 0.09, 0.1, 0.15, 0.2, 0.25, or 0.3 W/mK, including any value and range therebetween.

In some embodiments, the flow channel is characterized by a width of between 50 μm to 5 cm, e.g., 50 μm, 60 μm, 80 μm, 100 μm, 150 μm, 300 μm, 500 μm, 1000 μm, 2 cm, 3 cm, 4 cm, or 5 cm, including any value and range therebetween. By "width" it is meant to refer to distance (e.g., vertical distance) between walls of the flow channels.

In some embodiments, the recesses comprise a liquid characterized by a viscosity of up to 50, 60, 70, 80, 90, 100, 110, 120, 130, 140, or up to 150 Cp, including any value and range therebetween.

In some embodiments, the flow channel comprises a liquid characterized by a viscosity of 0.1, 1, 5, 10, 20, 30, 40, 50, 60, 70, 80, 90, 100, 110, 120, 130, 140, or 150 Cp, including any value and range therebetween.

The term "ceiling" is understood to refer to a generally upper inner surface that bounds the upper limit of a confined area e.g., the flow channel.

The term "actuation" relates to the capability of causing a flow, and, optionally, further supporting a mechanical action or motion of a layer thereupon (e.g., a ceiling layer).

Optionally, a vertical distance between the ceiling and the substrate interfacing a flow channel is 5 μm to 1 cm. Optionally, a vertical distance between the ceiling and the substrate interfacing a flow channel is 10 μm to cm. Optionally, a vertical distance between the ceiling and the substrate interfacing a flow channel is 50 μm to 0.1 cm. Optionally, a vertical distance between the ceiling and the substrate interfacing a flow channel is 5, 10, 100, 200, 300, 500, 600, 700, 800, 900, 1000, 5000, or 10,000 μm, including any value and range therebetween.

In some embodiments, the substrate's surface is superhydrophobic.

As used herein, a substrate's surface is considered superhydrophobic when it exhibits a static contact angle at least 100°, at least 110°, at least 120°, at least 130°, at least 140°, or at least 150°. In some embodiments, the term "contact angle" refers to water contact angle.

Non-limiting exemplary substrate comprises a material selected from: silicon, glass, Poly(dimethylsiloxane) (PDMS), parylene, Poly(methylmethacrylate), polyethylene, and any combination thereof.

Optionally, by "substrate" it is also meant to refer to a support having a coating (e.g., superhydrophobic coating) thereon.

In some embodiments, the substrate is characterized by a thermal conductivity of 0.015 W/mK to 2 W/mK. In some embodiments, the substrate is characterized by a thermal conductivity of 0.05 W/mK to 1.5 W/mK. In some embodiments, the substrate is characterized by a thermal conductivity of 0.1 W/mK to 1 W/mK. In some embodiments, the substrate is characterized by a thermal conductivity of 0.015, 0.05, 0.07, 0.09, 0.1, 1.2, 1.4, 1.6, 1.8, 2, 2.2, 2.4, 2.6, 2.8, or 3 W/mK, including any value and range therebetween.

As used herein, the term "coating" and "coated" refer to a separate and distinct layer of material from an underlying material. A coated material exhibits an identifiable boundary, e.g., diffuse or abrupt, between the coating material and the underlying material, e.g., support material, underlying coating, etc.

The term "surface" refers to the upper or outer part of an object.

In some embodiments, the actuation liquid and the substrate comprise light-absorbing material. In some embodiments, the substrate has attached thereto light-absorbing particles. In some embodiments, the light-absorbing material is in the form of particles. The material or the particles may be suspended in the actuation liquid, on an interface between two-liquids, or chemically or physically adsorbed on the substrate or on the ceiling layer.

That is, in one embodiment, local heat sources are implemented by adding light-absorbing nano-particles to the liquid. Illuminating the liquid by a desired light pattern, either through the elastic sheet or through the substrate, at an appropriate transmissive wavelength, results in localized heating of the liquid, leading to surface tension gradients which deform the surface, which then reflects and shapes the impinging light at the reflective wavelength (See FIGS. 1B-E).

Optionally, such a configuration may be used for optical detection beyond the spectral response of the detector. For example, a silicon charge coupled device (CCD) has a cut-off wavelength of 1.1 micron. A thermally emitting object (at wavelength of 2-12 micron) is imaged on the SLM device with the absorbing nano-particles suspended in liquid. The upper surface is transparent to the IR wavelength range, and reflecting at wavelength visible to the silicon CCD. The thermal image may be absorbed in the liquid, induces a local temperature distribution and deforms the surface.

Another wavelength, 532 nm for example, may illuminate the deformed reflecting surface and acquire the phase pattern of the surface. In this case the phase acquired at the 532 nm wavelength is the thermal image amplitude distribution. As known in the art, phase contrast imaging of the 532 nm light on the CCD camera converts the phase pattern back to intensity, which is recorded on the CCD. This way the Silicon camera may capture the image of a thermal body at wavelength far beyond the silicon spectral response.

The particles may be suspended in the actuation liquid on an interface between two-liquids, or chemically or physically adsorbed on the rigid substrate (actuation layer) or on a flow channel.

In some embodiments, the light-absorbing particles are characterized by a light absorbance efficiency of: at least 0.5%, at least 1%, at least 1.5%, at least 2%, at least 2.5%, at least 3%, at least 4%, at least 5%, at least 6%, at least 7%, at least 8%, at least 9%, or at least 10%.

None-limiting examples of light-absorbing particles include Ag, Au, Cu, Se, Te, As, Zn, Sn, Ga, Co, Pt, Pd, Ni, In, Ti, alloys thereof, and combinations of metals and alloys thereof.

The metal particles may have various morphologies or structures. For example, the metal nanoparticles may have regular shapes, irregular shapes, two-dimensional structures, and/or three-dimensional structures. Non-limiting examples of suitable regular shapes of the metal nanoparticles include spheres, oblate spheres, prolate spheroids, ellipsoids, rods, cylinders, cones, disks, cubes, and rectangles. In some embodiments, the metal nanoparticles may have the same or different shapes.

A device of the invention may comprise metal particles of the same metal or different metals, of the same or different shapes and/or of the same or different sizes.

In some embodiments, the particles are nanosized.

In some embodiments, the particle size of the metal nanoparticles is in the range of from about 1 to about 30 nm. As used herein, the particle size of a metal particle refers to the size of one or more characteristic dimensions of a given particle. The one or more characteristic dimensions of a metal particle upon which the size of the metal nanoparticle is based may depend upon the shape of the particle.

In one embodiment, a single aqueous fluidic layer is used and the substrate, or the ceiling layer, or both, are strongly hydrophobic. In another embodiment, two immiscible fluidic layers are stacked one on top of the other and the ceiling layer and substrate may be hydrophilic or hydrophobic.

In some embodiments, the recesses (e.g., micro-sized recesses) contain a fluid (e.g., gas or liquid). In some embodiments, the recesses (e.g., micro-sized recesses) contain gas and substantially devoid of liquid. In some embodiments, a flow channel contains a first liquid and the recesses (e.g., micro-sized recesses) are substantially devoid of the first liquid. In some embodiments, the recesses (e.g., micro-sized recesses) contain a fluid (e.g., gas or liquid) which is different from the first liquid.

In some embodiments, the heating element is at least one heating source or a plurality of heating sources. Optionally, the at least one heating source is configured to induce a predetermined and/or variable surface tension gradient on at least a portion of the actuation liquid.

Optionally, the motion of actuation liquid is altered due to an application of a tension caused by local temperate variance. Typical temperature variance is between 0.1° C. and 10° C.

Optionally, the heating element is an illumination means illuminating the liquid containing at an appropriate transmissive wavelength, resulted in localized heating of the liquid.

Optionally, ceiling layer comprises an elastic sheet. In some embodiments, the elastic sheet is a configurable layer (also termed herein "deformable plate").

In some embodiments, the elastic ceiling or sheet is in fluid communication with the actuating liquid and is configured to deform in response to a flow of the actuating liquid. In some embodiments, applying a heating elements e.g., illuminating the liquid by a desired light pattern, either through the elastic sheet or through the substrate, at an appropriate transmissive wavelength, results in localized heating of the liquid, leading to surface tension gradients which deform the surface, which then reflects and shapes the impinging light at the reflective wavelength.

Optionally, the elastic surface is a spatial light modulator (SLM). This elastic surface may take the form of an elastic plate, sheet, or membrane, or be the contact surface between two fluids, or the surface of a free-standing liquid. The surface may be either reflective or transmissive.

Optionally, the liquid cannel (layer) is thin, serving as spacer between the elastic surface and a rigid substrate which can be flat, curved, or free-formed. A local pressure field formed in the liquid, or a change in surface tension, may act on the elastic surface, resulting in its deformation.

Optionally, deformation of the elastic surface may exceed half of the wavelength of light. The light wavelength may be between 100 nm and 12 microns. FIGS. 1B-E schematically illustrate how an incident light beam is reflected with a phase change due to the local deformation of the surface.

Optionally, multiple liquid films are stacked. Local thermal sources may induce local pressure gradients which change the thickness of each layer. The reflected light obeys Bragg condition where the wavelength of the reflected light is linearly proportional to each layer thickness in the multilayer structure. This way thicker layer may reflect light at longer wavelength.

Figure 1E:
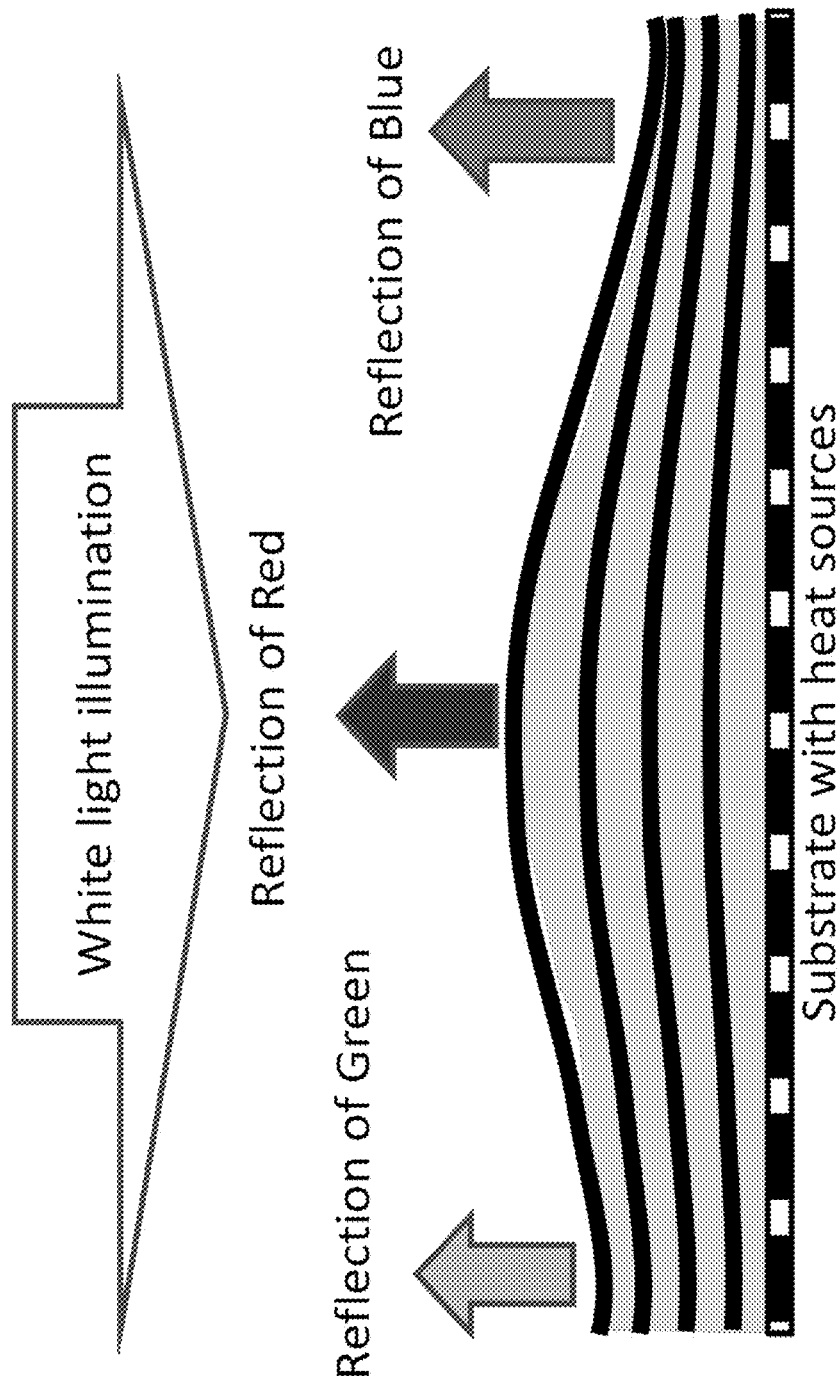
Figure 2A:
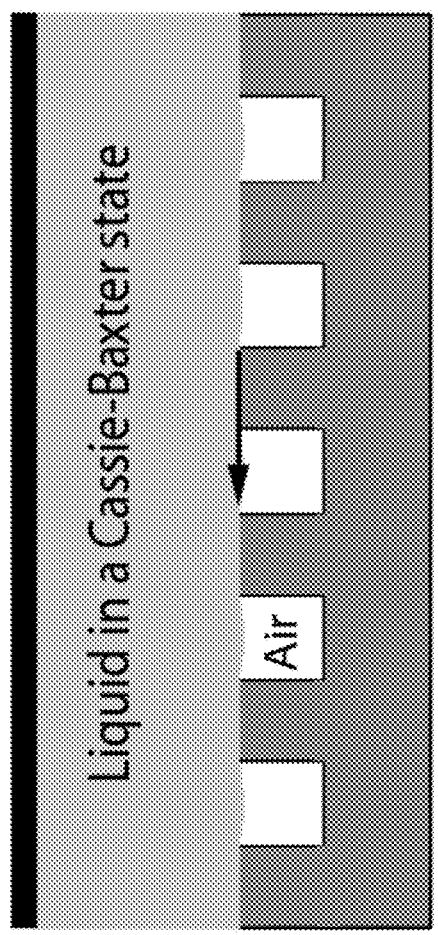
FIGS. 2A-B present non-limiting schematic illustration of exemplary configurations for thermocapillary flow in a closed system subjected to temperature gradients: flow over microstructured superhydrophobic surface due to an effective slip at the solid-liquid interface-side view (FIG. 2A) and top view (FIG. 2B).
Figure 2B:
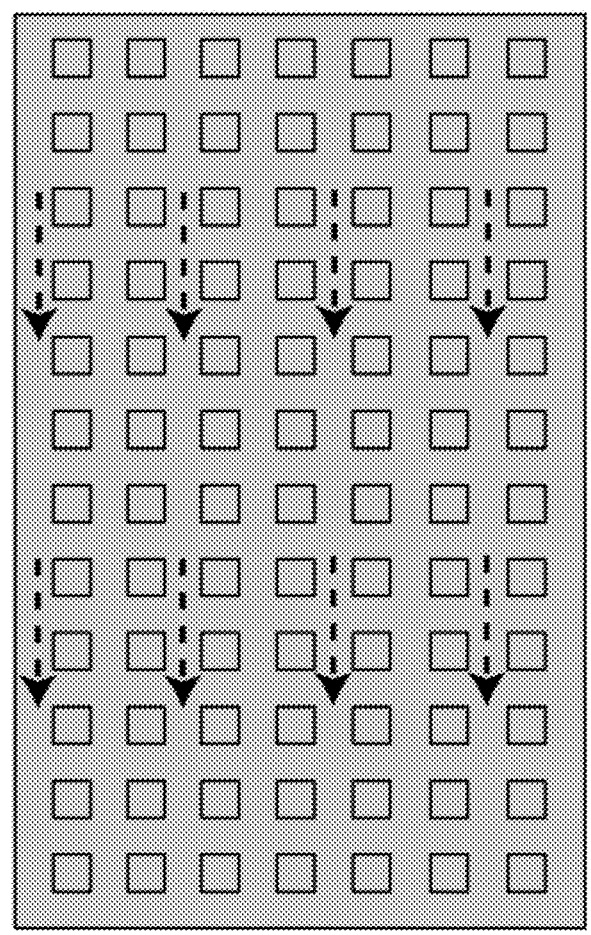

FIG. 1E shows the concept where white light illuminates the multilayer structure, yet different colors are reflected according to the temperature dependent pressure distribution.

Optionally, the ceiling layer or the substrate comprises a plate having one or more transparencies configured to allow light to shine through in a defined pattern. Optionally, the transparency is controlled by partially painting a ceiling layer. For example, the ceiling layer may partially comprise a black layer or be painted (e.g., in black) to maximize light absorption in a specific region. Optionally, the ceiling may contain a colored film to intense a specific range of the radiation, for example infrared radiation on a desired portion of the actuation liquid.

Optionally, the ceiling layer or the substrate comprises a film or a plate characterized by light absorbance over a defined range of wavelengths.

Non-limiting examples of defined ranges of wavelengths are infra-red (IR) (e.g., 700 nm to 1 mm) spectrum, the visible spectrum (e.g., 400 to 700 nm), or in the ultraviolet (UV) spectrum (e.g., 10 nm to 400 nm).

Optionally, the heating element is an electrode, disposed proximately to an interface of the flow channel and the substrate, configured to connect to a power supply. Under an applied electric field, electrode may provide a localized heat to the actuation liquid.

Herein, the term "electrode" is also meant to refer to an array of electrodes, and may refer to a single electrode or a plurality of electrodes. The terms "electrodes", "array of electrodes" or "arrangement of electrodes" do not necessarily refer to any specific geometric arrangement of electrodes.

Further, as used herein and in the art, the term "electrode" means an electric conductor through which a voltage potential can be measured. An electrode can also be a collector and/or emitter of an electric current. In some embodiments, an electrode is a solid and comprises a conducting metal.

A typical system may have a gap between the elastic surface and a rigid surface of a substrate of between 0.5 micron and 1 mm. Optionally, the ceiling layer is deforming surface (e.g., elastic sheet, plate or membrane) and a local pressure field may be formed in the liquid, or a change in surface tension, may act on the elastic surface, resulting in its deformation (see FIG. 1B).

In some embodiments, the elastic sheet is a configurable layer characterized by $E*h^3$ having a value e.g., below $10^{-5}$, wherein: "E" is Young's modulus of the membrane, and "h" represents at least one dimension of the membrane. In some embodiments, the dimension is a thickness of the membrane.

In some embodiments, $E*h^3$ has a value of e.g., $10^{-8}$, $10^{-9}$, $10^{-10}$, $10^{-11}$, $10^{-12}$, $10^{-13}$, or $10^{-14}$, including any value and range therebetween.

In some embodiments, the configurable layer (also termed herein deformable plate) is an elastic membrane e.g., an elastomeric polymer. In some embodiments, the membrane comprises a polymer characterized by Young's modulus of less than e.g., 1 MPa, 900 kPa, 800 kPa, 700 kPa, 600 kPa, 500 kPa, 400 kPa, 300 kPa, 200 kPa, 100 kPa, 90 kPa, 80 kPa, 70 kPa, 60 kPa, 50 kPa, 40 kPa, 30 kPa, 20 kPa, 10 kPa, or 1 kPa, including any value therebetween.

Typically, but not exclusively, membrane or sheet characterized by high modulus of e.g., 1 MPa dictates thin thickness, e.g., 10 µm. In some embodiments, the thickness of the membrane is 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1000 µm, or 2 mm, including any value therebetween.

As used herein and in the art, the term "Young's Modulus" refers to a quantification of the elasticity of a given material (also referred to as "stiffness"). Young's modulus, E, can be calculated by dividing the tensile stress by the tensile strain.

The System

In some embodiment, there is provided a system comprising the disclosed device in an embodiment thereof.

In some embodiments, the disclosed device is disposable in the disclosed system.

Optionally, the system as described herein further comprises a control unit.

Optionally, the control unit allows to control the heating element so as to induce a predetermined and variable flow of the actuation liquid.

Optionally, the disclosed system further comprises a computer program product.

Optionally, the computer program product comprises a computer-readable storage medium. The computer-readable storage medium may have program code embodied therewith. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to drawings and/or diagrams of methods, apparatus (systems), and computer program products according to embodiments of the invention. It will be understood that each illustration and/or drawing, and combinations thereof, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the drawings. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the drawings.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the drawings.

In some embodiments, the program code is excusable by a hardware processor.

In some embodiments, the hardware processor is a part of the control unit.

In some embodiments, there is further provided a read-out of the assay carried out in the disclosed system or device may be detected or measured using any suitable detection or measuring means known in the art. The detection means may vary depending on the nature of the read-out of the assay. In some embodiments, disclosed system also relates to an apparatus including the device in any embodiments thereof, and a detection means as described herein.

In some embodiments, there is provided a method comprising the steps of: a method comprising the steps of: (a) providing a device having: (i) a ceiling; (ii) a substrate (iii) one or more flow channels disposed between the substrate and the ceiling and containing an actuation liquid; and optionally (iv) a heater, wherein at least one substrate comprises one or more recesses distributed throughout at least the substrate the recesses being open to a flow channel and containing a fluid; and wherein 50% to 80% of the flow channel liquid-substrate interface, interfaces with said fluid within said recesses; and (b) providing thermal energy to the actuation liquid so as to establish a temperature gradient of the actuation liquid, thereby generating pressure distribution or a velocity field in the actuation liquid. In some embodiments, the ceiling layer has an elastic film, and the pressure distribution of the actuating liquid deforms a defined region of the elastic film upon providing thermal energy.

In some embodiments, the ceiling layer has an elastic film, and the flow of the actuating liquid deforms a defined region of the elastic film upon providing thermal energy.

Embodiments of "recesses", "substrate", "flow channel", "fluid", "actuation liquid", "ceiling", and "elastic film" are described hereinthroughout.

General

As used herein the term "about" refers to ±10%.

The terms "comprises", "comprising", "includes", "including", "having" and their conjugates mean "including but not limited to". The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, biological, biochemical, mechanical, and medical arts.

As used herein, the term "treating" includes abrogating, substantially inhibiting, slowing or reversing the progression of a condition.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

EXAMPLES

Reference is now made to the following examples which, together with the above descriptions disclosed herewith, illustrate the invention in a non-limiting fashion.

Figures 3A, 3B:
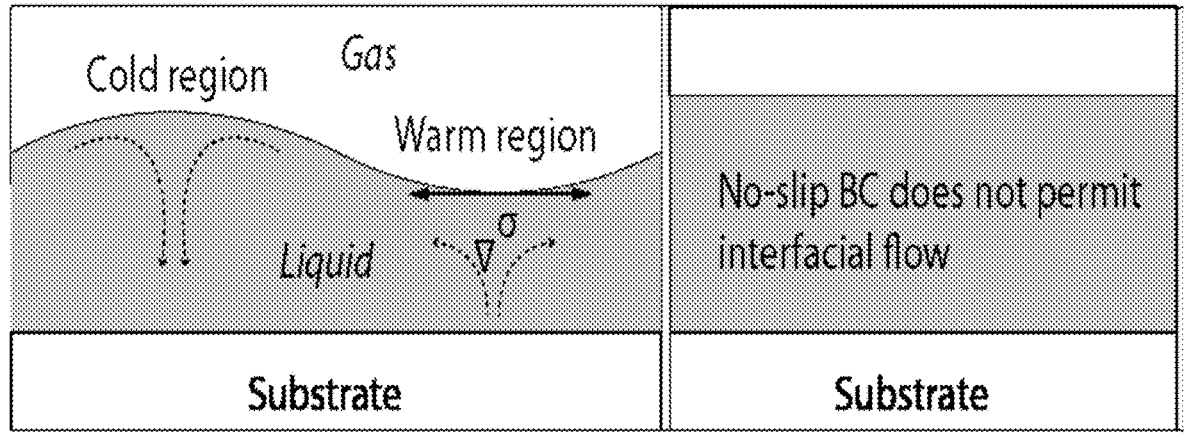
FIGS. 3A-C show a schematic illustration of possible microfluidic configurations: a 'classical' free surface configuration where non-uniform heating leads to surface tension gradients and thermocapillary flow, but suffers from evaporation and instability of the liquid film (FIG. 3A); a standard microfluidic channel with two fully-wetted walls, does not give rise to thermocapillary flow due to lack of a free surface (FIG. 3B); and a microfluidic channel with one superhydrophobic surface; thermocapillary flow is possible along the gas-liquid interface (FIG. 3C).
Figure 3C:
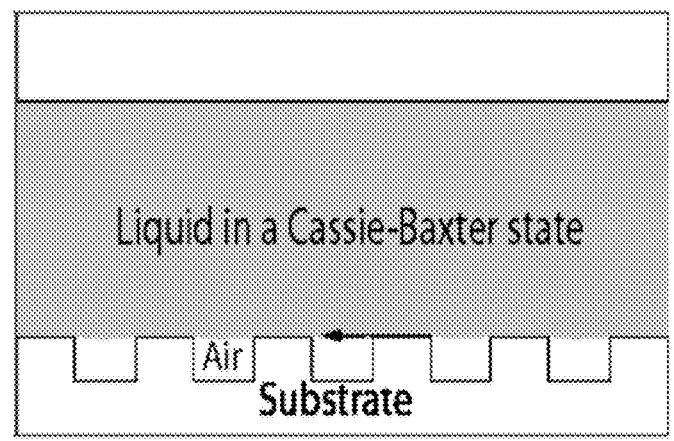
Figure 4A:
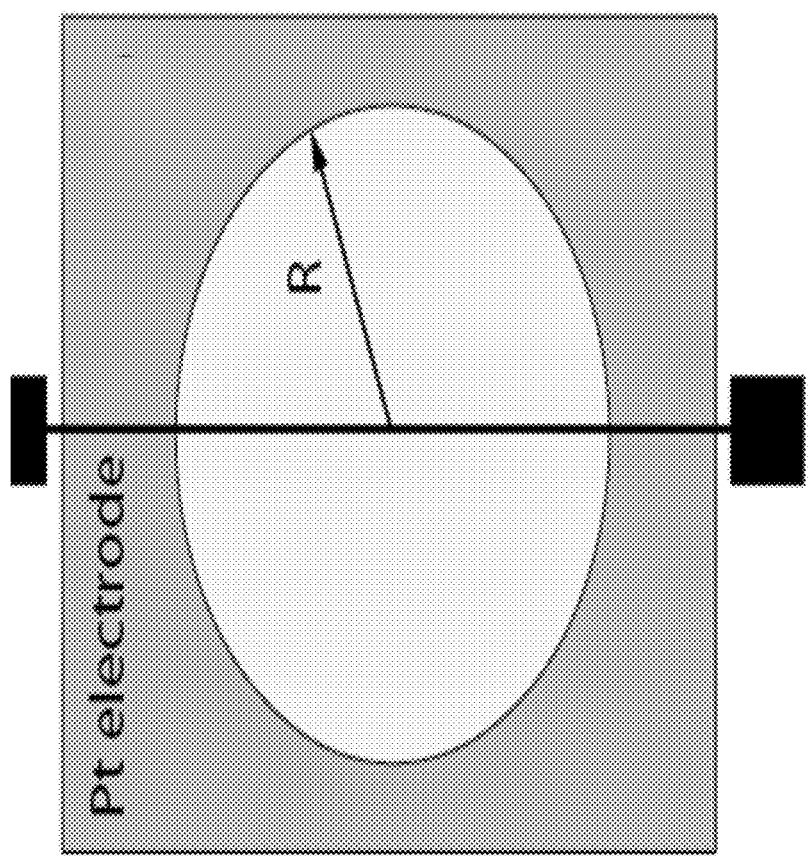
FIGS. 4A-E present: experimental measurements of thermocapillary flow over superhydrophobic surfaces (FIG. 4A); a schematic illustration of the experimental setup consisting of a 50 µm thick, superhydrophobic surface of microstructured polydimethylsiloxane (PDMS) underlying a 500 µm deep circular reservoir having a diameter of 8 mm, filled with aqueous solution of deionized water with 1 µm fluorescent beads; a 50 µm wide Pt electrode is printed at the bottom of the reservoir, allowing localized heating of the liquid layer (FIG. 4B); the superhydrophobic surfaces is composed of 5×5 um square poles, with 10 um distance between their edges (FIG. 4C); an image of the experimental setup on the microscope (FIG. 4D); experimental results showing the absolute value of the maximal average flow velocity due to the thermocapillary slippage, as a function of the current passing through the Pt electrode. The velocity field was obtained using Particle Image Velocimetry (PIV), the values for |V| were obtained by averaging over the 20 largest velocity vectors for a given current, with error bars indicating twice the standard deviation in the data, while the inset depicts the velocity field for I=22 Ma (FIG. 4E).
Figure 4B:
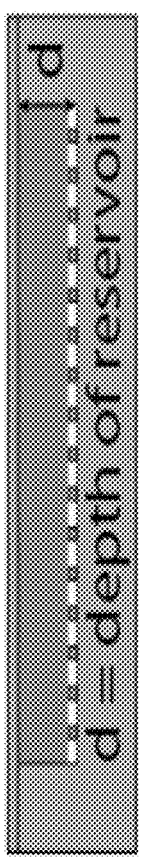
Figure 4C:
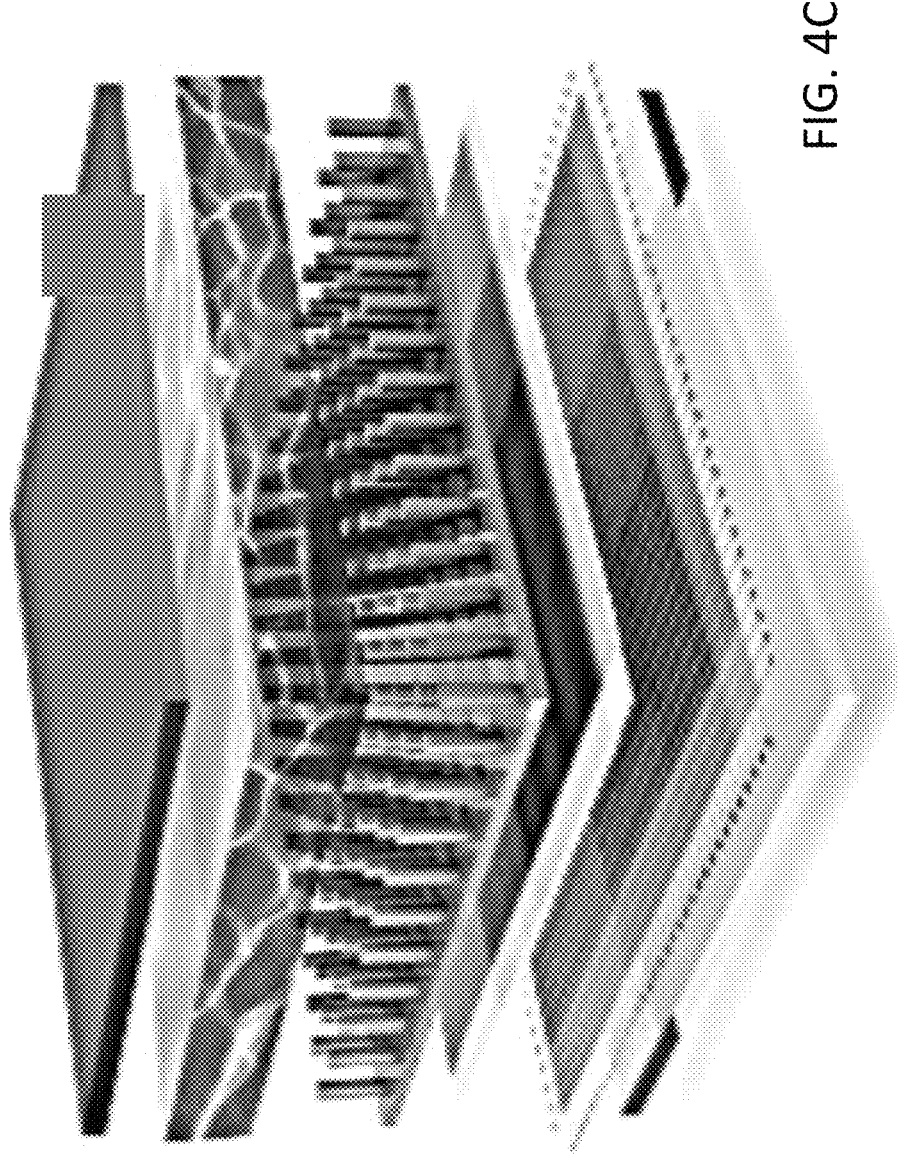
Figure 4D:
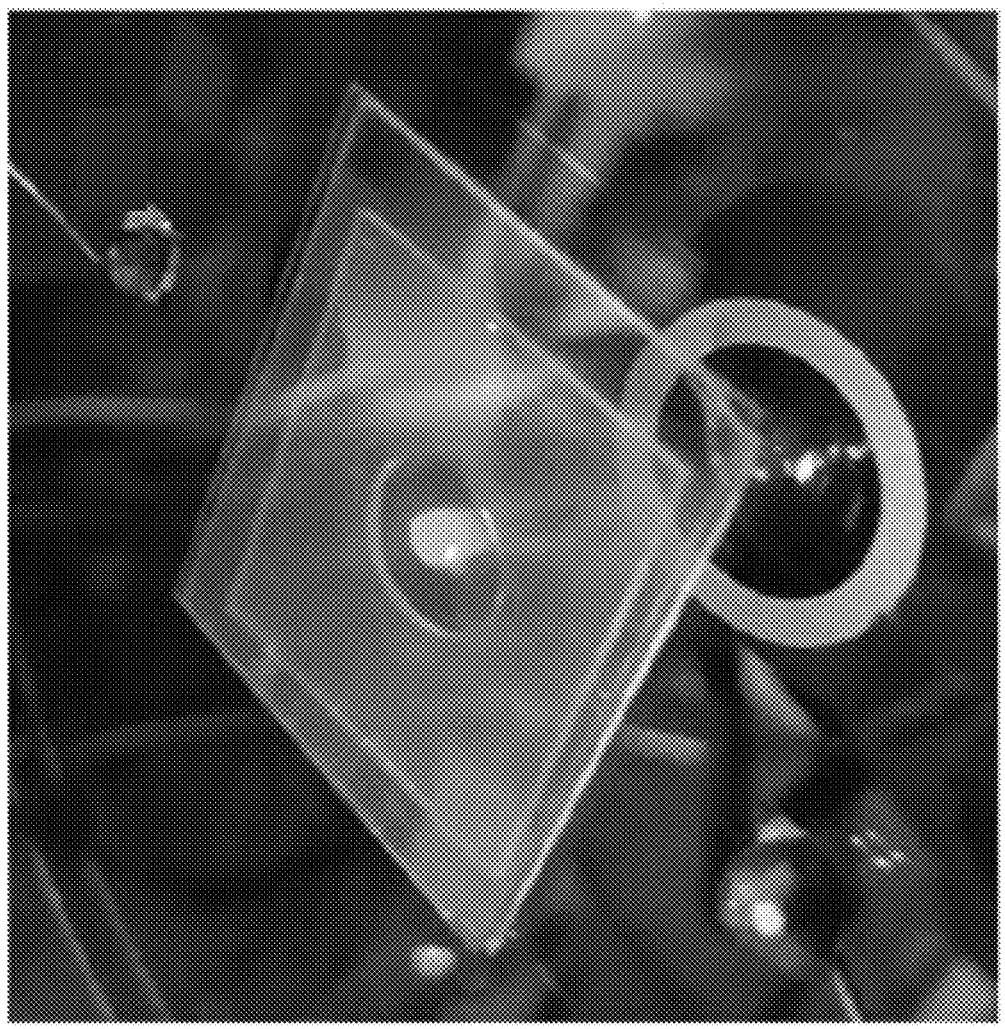
Figure 4E:
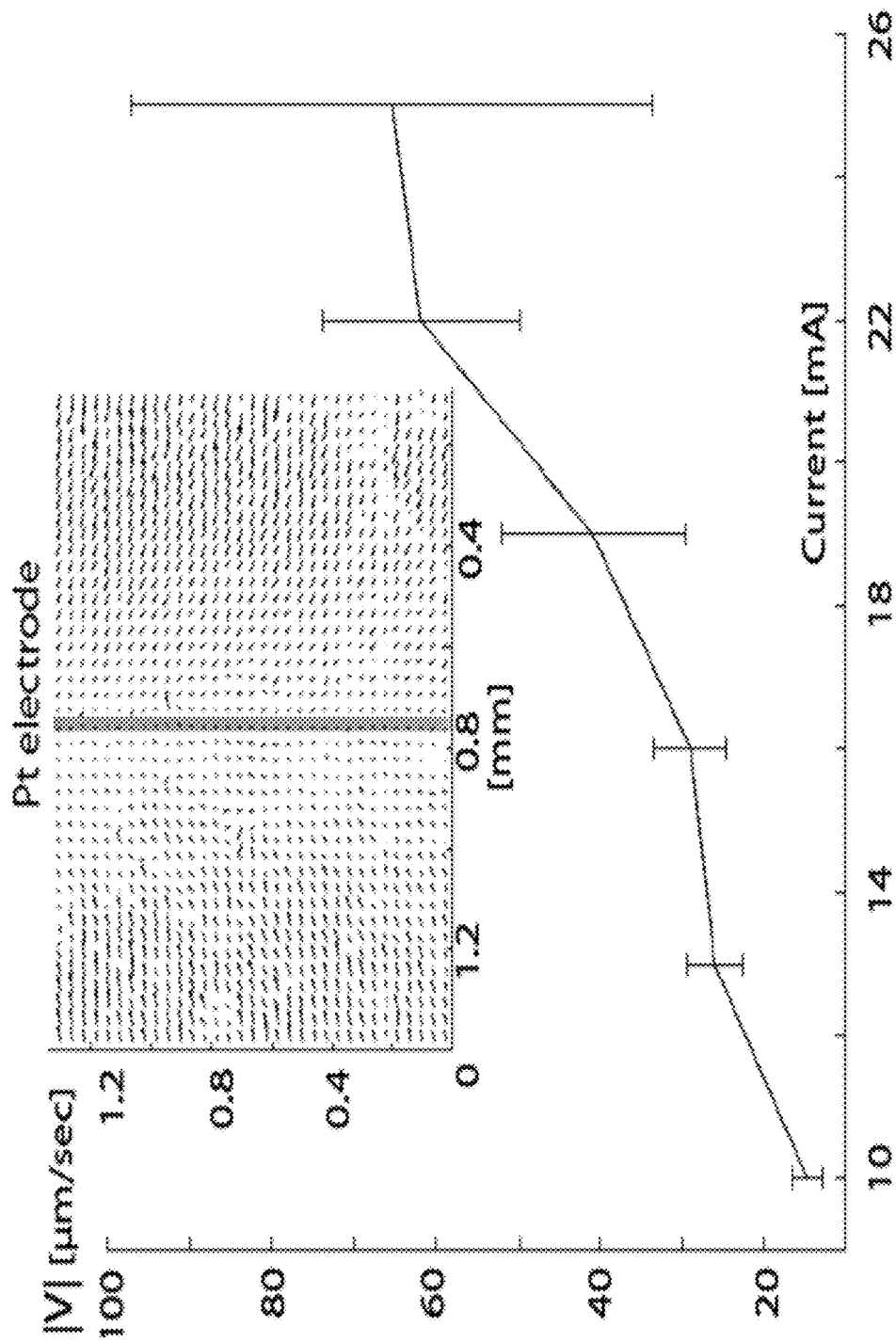

As illustrated in FIG. 3C, if a liquid is placed on a micro-structured surface, with a specific topographical configuration, it attains a super-hydrophobic Cassie-Baxter state with mixed no-slip and no-shear boundary conditions on the liquid-solid interface. In such a configuration, interfacial flow is possible along the no-shear regions of the liquid-solid interface, giving rise, by means of viscosity, to directional flow in the liquid bulk.

FIGS. 4A-E present experimental results demonstrating for the first time the implementation of thermocapillary flow over a superhydrophobic surface.

This project goes far beyond the state of the art, as it takes the first step in transitioning thermocapillary flow over superhydrophobic surfaces.

The experimental setup allows highly controlled experiments, which assist in model validation and/or provide additional insight onto aspects of the phenomenon which are yet to be captured by existing models.

The current experimental setup elucidates the basic physical phenomena of thermocapillary driven flows in closed configurations, while at the same time providing key experimental demonstrations of its utility. This also leads to new theoretical questions to be answered, such as problem description in finite domains.

Example 1

Infrastructure for Spatial Temperature Distribution

In exemplary procedures, experimental infrastructure was developed, allowing real time control of spatial temperature gradients in a microfluidic chamber.

The control of thermocapillary flows relies on the ability to obtain a well-defined temperature gradient along the working domain. While basic physical experiments can be performed using simple heating electrodes, here a robust and flexible infrastructure was developed that would allow a high degree of freedom in spatial and temporal temperature control. Any other application which requires spatially patterned thermal control can utilize this infrastructure.

Methods

Figures 5A, 5B:
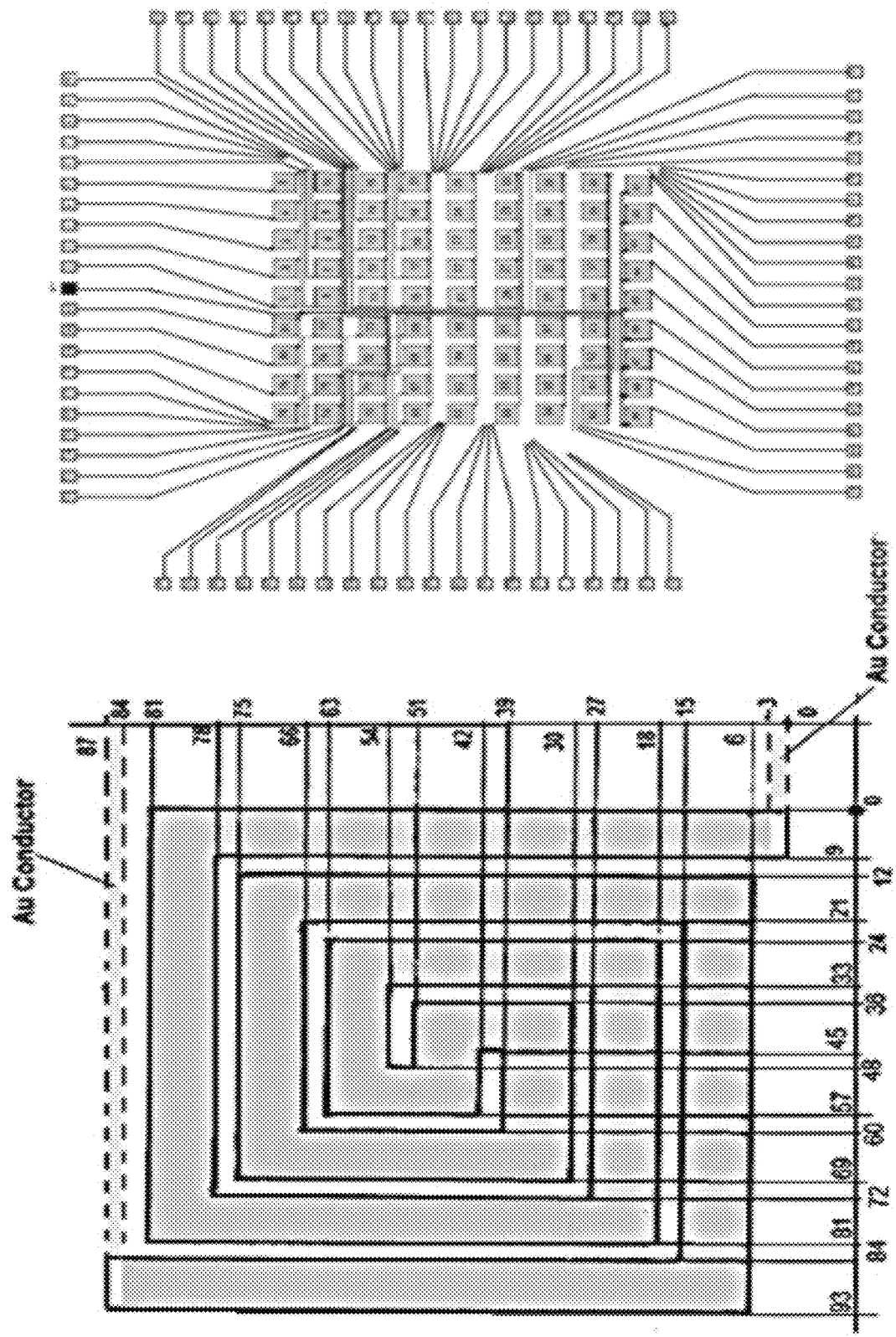
FIGS. 5A-C present a design of a thermal actuation chip: each heating element is comprised of NiCr spiral electrode, with total nominal dimensions of 100 um×100 um; two low-resistance Au conductors lead to each heater (FIG. 5A); spatial temperature control is achieved using a 9×9 array of such microheaters, each connected to a pair of pads (FIG. 5B); the chip is operated by a dedicated PCB with the temperature of each heater assigned by a computer (FIG. 5C).
Figure 5C:
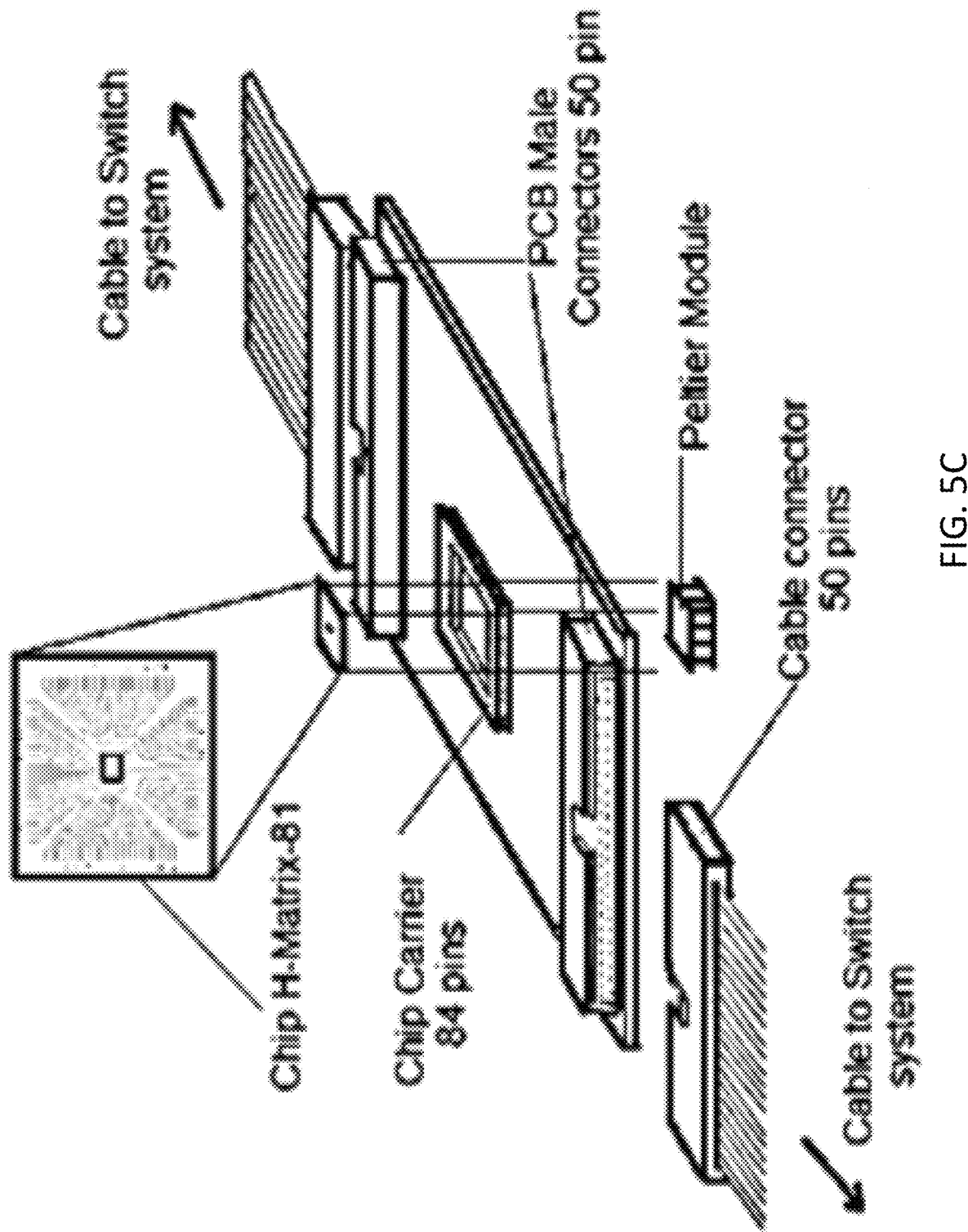

FIGS. 5A-C present the concept the chip, which will consist of a 9×9 array of individually-addressable heating electrodes. Each spiral-shaped heating element (FIG. 5A) has a 100 µm×100 µm footprint with a nominal inter-electrode distance of 50 µm, for a total active area of 1.3×1.3 mm—compatible with the field of view obtained using a 10× magnification objective on a standard microscopy imaging system.

For a larger working area the number of heating elements were maintained while the spacing was increased up to a working area of 1.5×1.5 cm, dictated by the dimensions of the chip carrier. The array was fabricated using standard lithography and metal deposition processes available in cleanroom facilities. Each heating element was made of a 300 nm layer of NiCr (1.2 ohm*mm^2/m resistance) and was connected to connector pads at the perimeter of the chip (FIG. 5B) via 500 nm thick Au conductors (0.023 ohm*mm^2/m resistance).

The calculations show that in this way, less than 10% of the power are dropped over the conductors. Using a 1 V operating voltage, the maximum power density that can be produced over the heater is ~200,000 W/m$^2$.

The entire chip was placed on top of a thermoelectric cooling element (TEC/Peltier), which served as a heat sink to guarantee a limited region of influence for each heating element to allow a sustainable steady-state. The pads layout was set to match that of an 84-pin chip carrier (KYOCERA C-QFN), and each pad was connected to its corresponding pin via wire-bonding and covered with epoxy to protect the bonding but allow a 1.5 cm×1.5 cm working area in which the flow chamber was placed.

The chip carrier was mounted on a dedicated PCB which was interface the carrier's pins to a set of wires via standard 50-pin connectors (FIG. 5C). The wires were connected to an off-the-shelf 128-channel controller (2× PhidgetLED-64) connected to a PC running Matlab by a serial connection.

To measure the temperature in the chamber, a shallow (Hele-Shaw) microfluidic chamber was placed on top of the electrode structure, filled it with a temperature sensitive fluorescent dye (Rhodamine B) and a temperature in-sensitive dye (Rhodamine 110) for calibration, and imaged it on an upright epifluorescent microscope.

The chamber was constructed of a 20 µm PDMS layer to allow maximum proximity to the heating electrodes, a 50 µm PDMS frame serving as a gasket, and a drilled glass slide serving as a rigid ceiling with reservoirs. Using real-time temperature measurements, the effect of heating power and Peltier cooling power on the spatial distribution and temporal response of the temperature were characterized around each heating element.

In a second generation chip a significantly increased resolution of the "temperature maps" was aimed at, while eliminating the dependence on an electrode array.

In exemplary procedures a DMD-based light projector was constructed to illuminate the superhydrophobic structure with arbitrary light patterns. By painting the outer surface of the superhydrophobic sheet in black, maximum absorbance of the light by the substrate was insured.

A metal halide light source (Intensilight, Nikon) was used with a total power (out of the liquid guide) of 3 W (integrated over all wavelengths). By controlling the magnification of the projection objective the size of the active area was adjusted, with a tradeoff between this size and the power density. Assuming a conservative 60% absorbance efficiency by the surface, a 1 cm×1 cm projection area would result in a power density of 20,000 W/m².

Example 2

Experimental Study of Thermocapillary Flow Over Superhydrophobic Surfaces

Herein, the aim was to demonstrate, characterize, and model flow in closed microfluidic devices based on thermocapillary effects on superhydrophobic surfaces.

A successful implementation of this aim was the first experimental demonstration of the phenomenon, and provides a wide experimental basis for its characterization and modeling. Furthermore, since existing theory is limited to semi-infinite domains, its expansion for finite-height channels is expected to yield useful corrections for implementation in microfluidic devices.

Methods and Results

FIGS. 6A-F present results of superhydrophobic microstructures. The molds for the microstructures was produced using a deep reactive ion etching (DRIE) process followed by a silanization of the surface. A thin (20 μm) layer of PDMS was casted by spinning, and using a peeling process enabled to produce thin membranes which are flat on one side and microstructures on the other side (see FIG. 6E). When placed on top of the heating elements, the thin membrane allows nearly direct heating of the microstructures and (assuming a Cassie state), of the free surface.

The superhydrophobic structures must be optimized to find the balance between two conflicting requirements: on one hand, a larger distance between pillars (e.g., aligned pillars, staggered pillars, longitudinal trenches, and perpendicular trenches) results in a larger free surface for thermocapillary forces to act on, and potentially higher velocities. On the other hand, larger free surfaces are more susceptible to instability which may transition the surface from a Cassie state to wetting Wenzel state, thus eliminating the thermocapillary effect.

This instability is further affected by the depth of the gaps between posts (with deeper gaps requiring higher pressures before transition occurs), as well as by condensation between the pillars.

A range of microstructure topologies (e.g., aligned pillars, staggered pillar, longitudinal trenches, and perpendicular trenches) was explored, while varying the distance between features as well as the etch depth determining the height of the pillar.

Figure 7A:
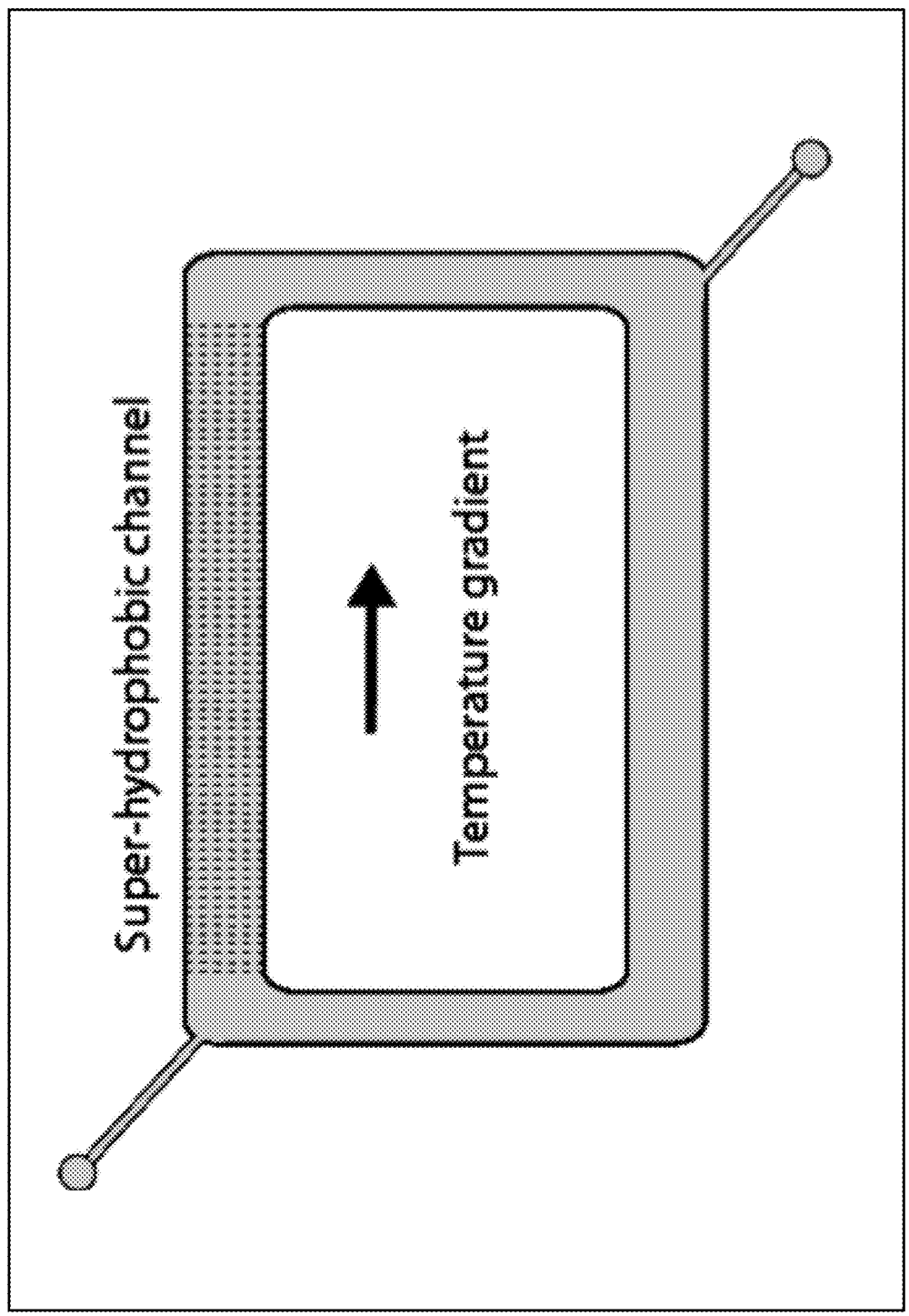
FIGS. 7A-C present: schematic illustration of the 'racing track' microchannel configuration, designed for assessing the performance and stability of different superhydrophobic structures. By subjecting the channel to a temperature gradient, the superhydrophobic section circulates the flow through the entire channel (FIG. 7A); an image of a silicon mold containing multiple configurations (FIG. 7B); and a preliminary experimental results showing fluorescent beads driven by thermocapillary flow in a 'racing track' channel (FIG. 7C).
Figure 7B:
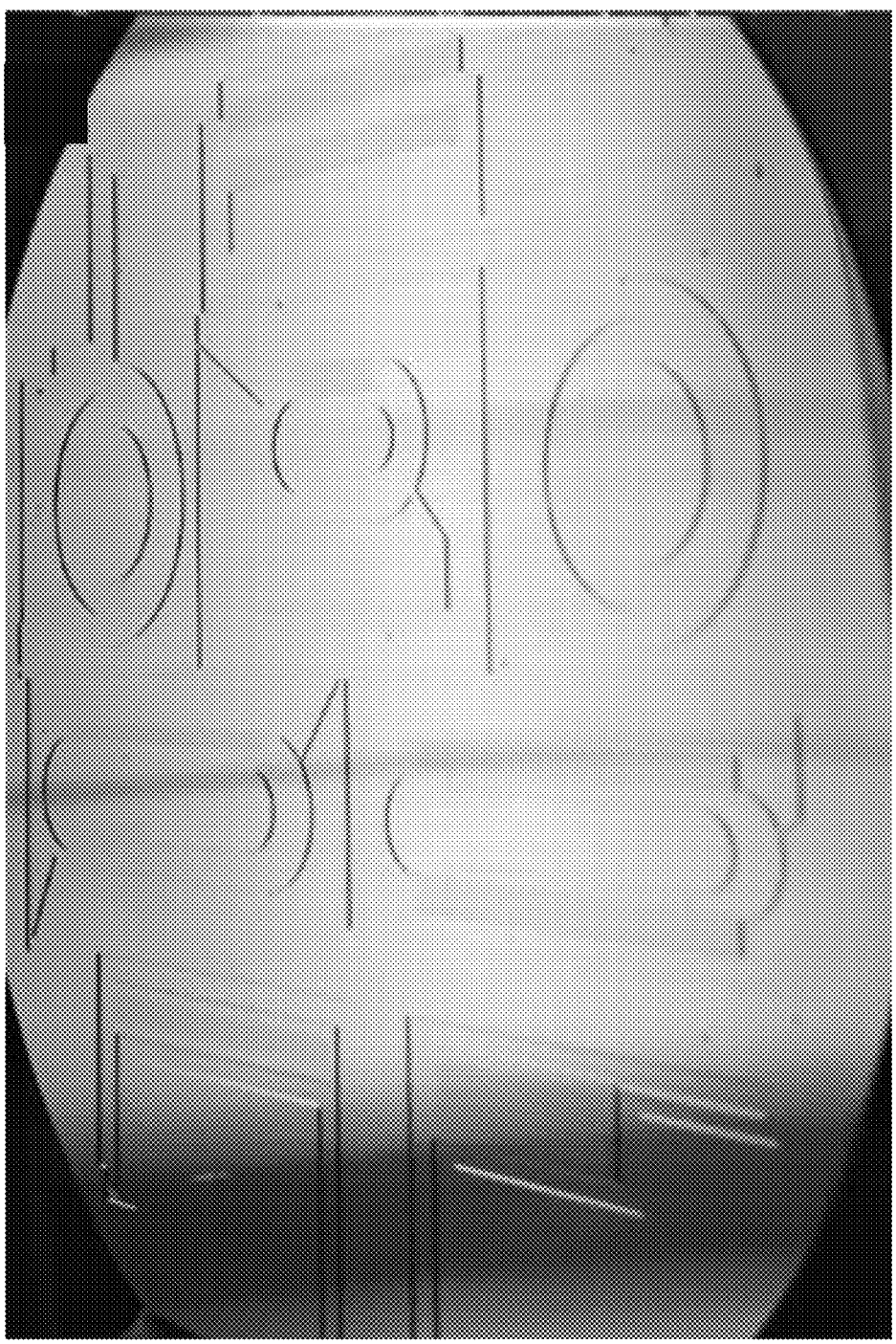

Then the performance of each such geometry was tested using a "racing track" configuration, depicted in FIGS. 7A-B.

Figure 7C:
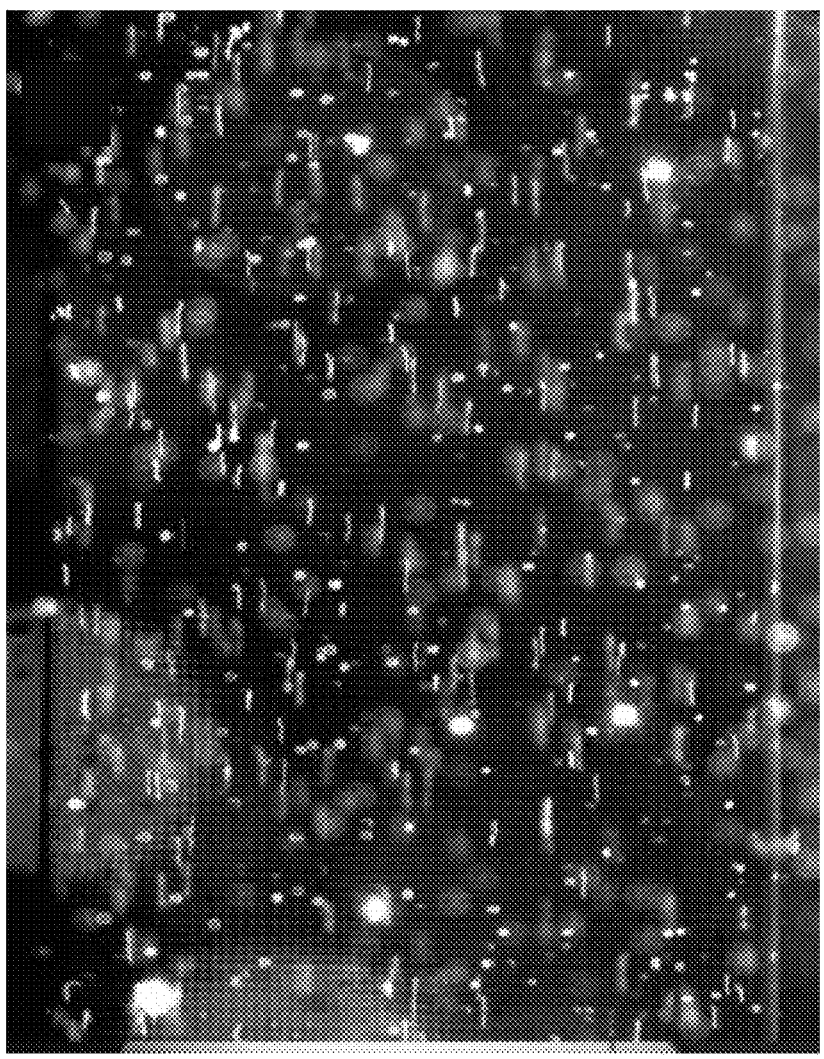

The racing track consists of a closed rectangular channel with a superhydrophobic structure patterned only on one of its sides. Two significantly smaller channel lead to the edges of the racing track for filling purposes. As demonstrated by the results shown in FIG. 7C, subjecting the structure to a temperature gradient parallel to the superhydrophobic channel, thermocapillary flow induces flows through the entire channel. This configuration is preferred over a standard channel connected to two reservoirs, as thermocapillary effect in the reservoirs themselves may lead to undesired flow.

For each configuration the temperature gradient was fixed, and the velocity in the channel over time using standard μPIV was measured and analyzed using open PIV.

The minimum temperature gradient required to induce fluid motion can be characterized as well as the slope of velocity vs. temperature gradient, and the duration of stable operation at each temperature gradient.

For thermocapillary effects to become dominant over other thermal phenomena (such as buoyancy driven flow), the depth scale of the system at hand must be on the order of hundreds of microns or smaller.

Figure 8:
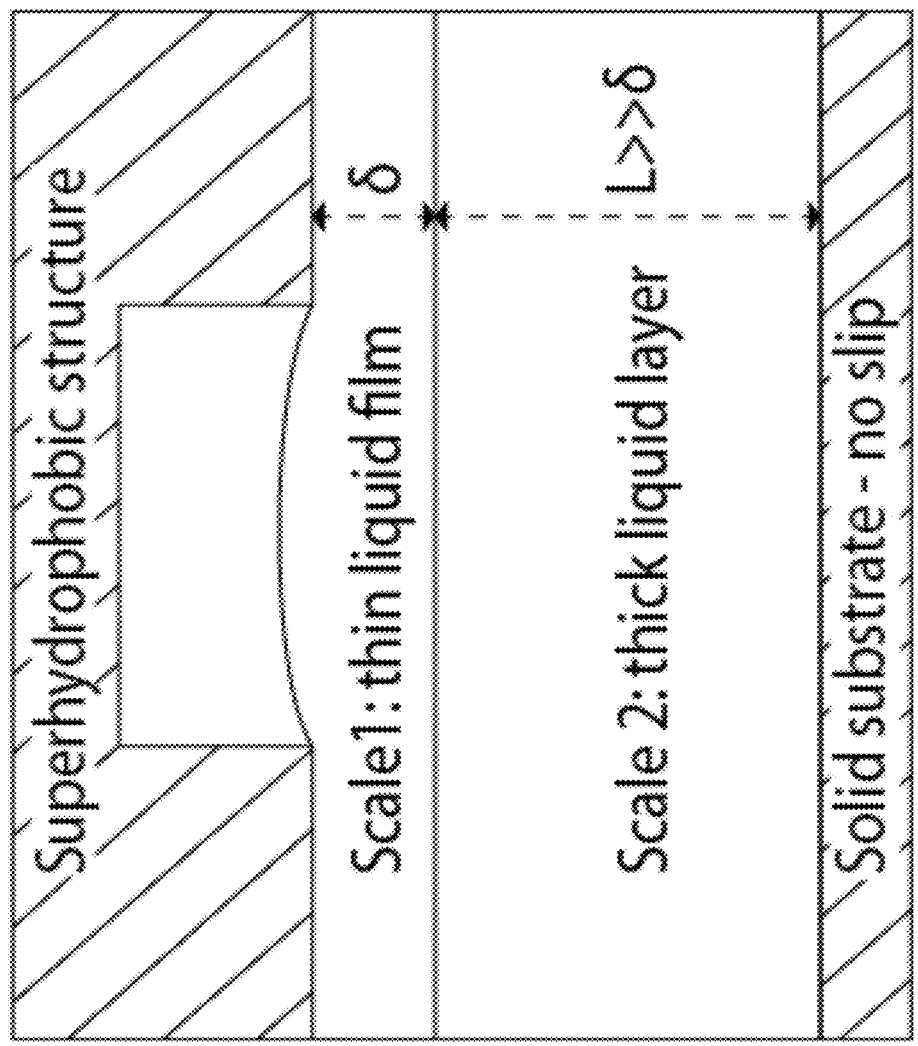
FIG. 8 presents a schematic illustration of a single trench element in a finite-height channel, to be modeled with periodic boundary conditions. In one approach, the flow field is solved by assigning a non-uniform slip velocity on the superhydrophobic surface, expressing it using a Fourier series and solving Stokes' equation directly. In an alternative approach, a thin liquid layer is close to the superhydrophobic structure, where a long-wave approximation would hold, while matching it with an external solution in the rest of the channel.

FIG. 8 presents a schematic illustration of a single trench element, which is assumed to represent the entire surface by periodic boundary conditions. The first approach for solution may be a direct one in which a step function in slip velocity over the upper surface is approximated using a Fourier series, and solve Stokes' equations by separation of variables.

As an alternative approach, a multiple scale asymptotic expansion was considered, connecting two regions of the flow: (1) a thin layer of liquid in the proximity of the microstructure, where long-wave approximations are valid, and (2) a thick liquid layer describing the far field flow with no-slip boundary condition at the solid-liquid interface. The experimental results with existing and resulting theoretical model were compared.

Using the spatial heating infrastructure, the ability to implement desired flow patterns with arbitrary geometries in a microfluidic chamber was demonstrated.

Hydrophilic Channel

Figure 10:
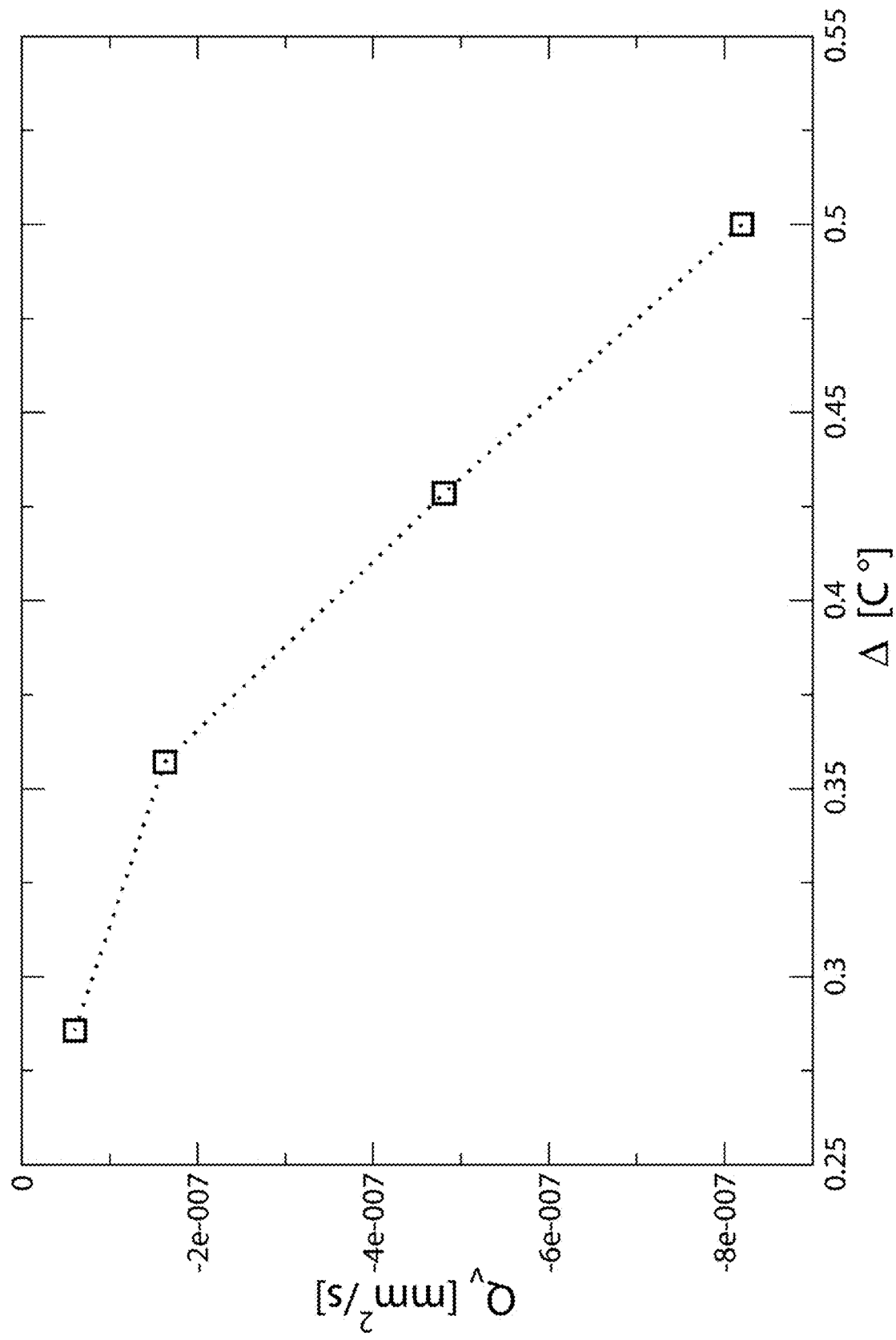
FIG. 10 presents experimental measurements of the volumetric flow-rate of the reservoir-driven thermocapillary flow, as a function of the temperature difference across the reservoir. The measurement was taken for a channel of width 1 mm, height 0.4 mm and length 40 mm.
Figure 11B:
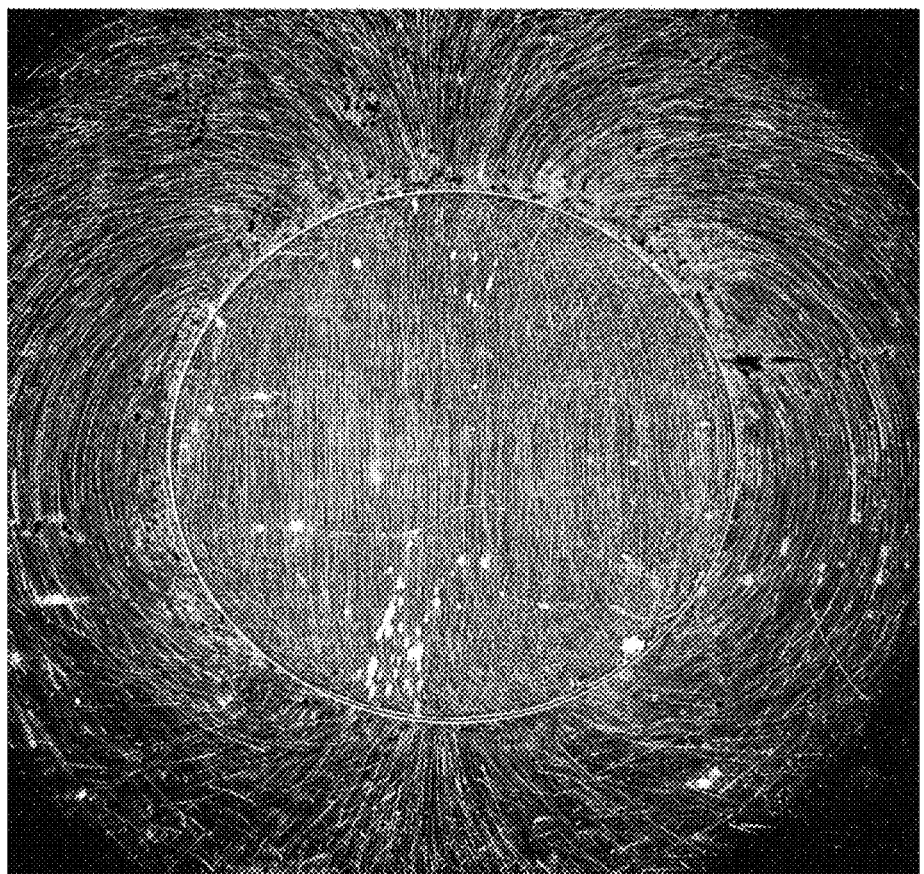
FIGS. 11A-B present images showing theoretically predicted streamlines for a thermocapillary dipole in a Hele-Shaw cell (FIG. 11A), and an experimental measurement of a doublet flow obtained by stacking multiple images taken with one second interval between each two images (FIG. 11B). The diameter of the circular reservoir is 5 mm, the depth is 0.5 mm, and the temperature difference between the hot and the cold sides of the reservoir is 0.5 degrees Celsius.
Figure 11A:
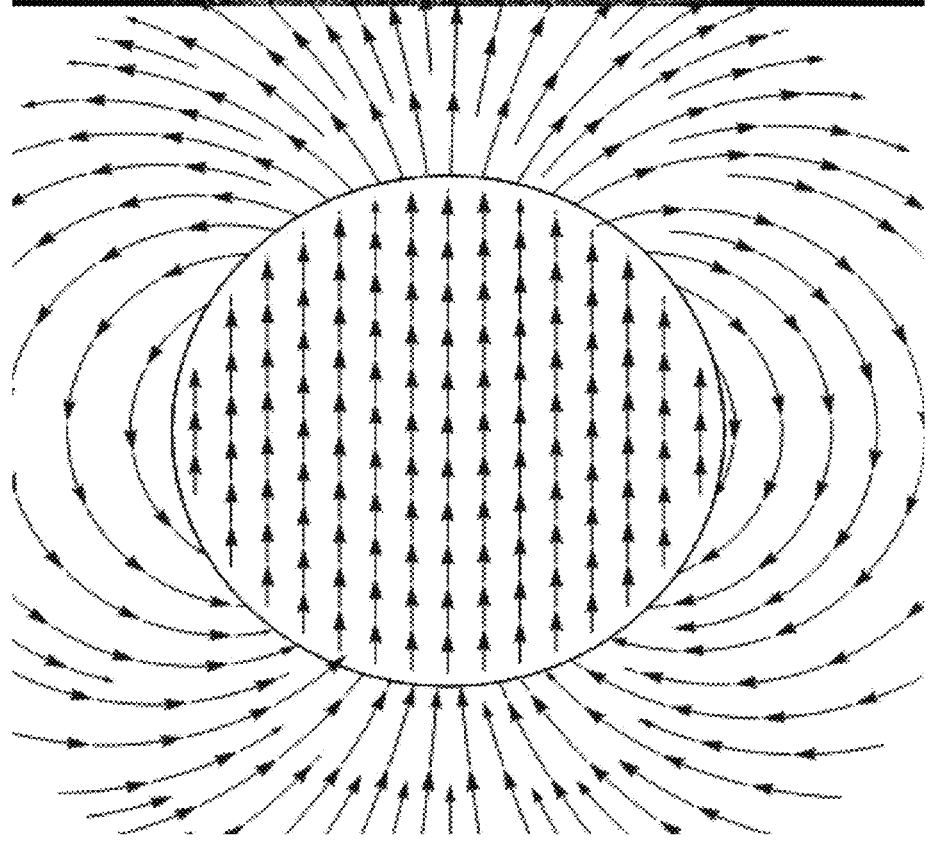

As an alternative driving mechanism is hydrophilic channel connected to a standard reservoir that is open to the atmosphere. In exemplary experimental results (FIGS. 9A-B) subjecting the reservoir to a temperature gradient was found to be sufficient for driving flow throughout the channel. Without being bound by any particular theory, this can be explained by thermocapillary flow on the free surface of the reservoir, which (since the liquid is surrounded by the rigid walls) results in dipole flow within the reservoir. This dipole flow is characterized by positive and negative pressures at its poles, which drive the flow in the channel. To validate the model and characterize the performance of this 'solid state' pumping mechanism, construct several devices were constructed with different reservoir diameters and different channel resistances (diameter or length). For each configuration, the minimum temperature gradient required to initiate flow in the channel was characterized, and the flow rate as a function of the temperature gradient was measured. FIG. 10 presents experimental measurements of the volumetric flow-rate of the reservoir-driven thermocapillary flow, as a function of the temperature difference across the reservoir. The measurement was taken for a channel of width 1 mm, height 0.4 mm and length 40 mm. FIGS. 11A-B present images showing theoretically predicted streamlines for a thermocapillary dipole in a Hele-Shaw cell (FIG. 12A), and an experimental measurement of a doublet flow obtained by stacking multiple images taken with one second interval between each two images (FIG. 12B). The diameter of the circular reservoir is 5 mm, the depth is 0.5 mm, and the temperature difference between the hot and the cold sides of the reservoir is 0.5 degrees Celsius.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A device comprising:
   (i) at least one substrate;
   (ii) a ceiling;
   (iii) one or more flow channels disposed between said substrate and said ceiling and configured to contain an actuation liquid;
   (iv) one or more recesses distributed throughout at least said substrate and open to said flow channel and configured to contain a fluid;
   wherein 50% to 80% of the flow channel liquid-substrate interface, interfaces with said fluid within said recesses, and
   (v) at least one heating element, configured to heat one or more portions of the actuation liquid and generate a temperature gradient within said actuation liquid; and
   wherein said ceiling or said substrate comprises any one of (i) a plate having one or more transparencies configured to allow light to shine through in a defined pattern; and (ii) a film or a plate characterized by light absorbance over a defined range of wavelengths selected from the infra-red (IR) spectrum, the visible spectrum, or in the ultraviolet (UV) spectrum.

2. The device of claim 1, wherein any one of: (i) said recesses are microsized; (ii) said temperature gradient generates a pressure distribution or a velocity field in the actuation liquid; (iii) at least one of said flow channels is interposed between said substrate and said ceiling; (iv) said fluid is selected from a gas or a liquid characterized by a viscosity of up to 100 Cp.

3. The device of claim 1, being in the form of a closed chamber.

4. The device of claim 1, wherein said actuation liquid is characterized by any one of: (i) a viscosity of 0.1 Cp to 100 Cp; (ii) an interfacial tension of 0.1 mN/m to 75 mN/m; (iii) a thermal conductivity of 0.015 W/mK to 0.3 W/mK; and (iv) a liquid selected from Newtonian liquid and a non-Newtonian liquid.

5. The device of claims 1, wherein said substrate is characterized by a thermal conductivity of 0.015 W/mK to 2 W/mK.

6. The device of claim 1, wherein a vertical distance between said ceiling and said substrate is 5 µm to 1 cm.

7. The device of claim 1, wherein any one of: (i) said recesses are characterized by a depth of 5 to 100 µm; and (ii) a volume of said recesses varies within less than ±30%.

8. The device of claim 1, wherein said substrate is selected from any one of: (i) a substrate characterized by a thickness of 100 to 1000 µm; (ii) a superhydrophobic substrate; (iii) a substrate characterized by a static water contact angle of at least 100°; and (iv) a substrate having attached thereto light-absorbing particles, characterized by a light absorbance efficiency of at least 1%.

9. The device of claim 8, wherein said superhydrophobic substrate comprises a material selected from the group consisting of: silicon, glass, Poly(dimethylsiloxane) (PDMS), parylene, Poly(methylmethacrylate), polyethylene, and any combination thereof.

10. The device of claim 1, wherein said ceiling is selected from (i) a ceiling comprising a superhydrophobic material; and (ii) a ceiling comprising an elastic sheet.

11. The device of claim 10, wherein said elastic sheet is selected from: (i) a sheet characterized by $E*h^3$ having a value of $10^{-13}$ to $10^{-9}$ N*m, wherein "E" is Young's modulus of said membrane, and "h" is a thickness of said membrane; and (ii) a sheet in fluid communication with said actuating liquid and is configured to deform in response to a flow of said actuating liquid.

12. The device of claim 1, wherein said actuation liquid, comprises light-absorbing particles, characterized by a light absorbance efficiency of at least 1%.

13. The device of claim 1, wherein said recesses are selected from gas-containing recesses and recesses substantially devoid of liquid.

14. The device of claim 1, wherein said heating element is selected from (i) a plurality of electrodes, disposed proximately to an interface of said flow channel on said substrate; and (ii) illumination means.

15. The device of claim 1, wherein said flow channel is characterized by a width of between 50 um to 5 cm.

16. The device of claim 1, further comprising a control unit configured to provide a predetermined and/or variable heat toward one or more regions of said actuation liquid.

17. A device comprising:
   (i) at least one substrate;
   (ii) a ceiling comprising an elastic sheet;
   (iii) one or more flow channels disposed between said substrate and said ceiling and configured to contain an actuation liquid;
   (iv) one or more recesses distributed throughout at least said substrate and open to said flow channel and configured to contain a fluid;
   wherein 50% to 80% of the flow channel liquid-substrate interface, interfaces with said fluid within said recesses, and
   (v) at least one heating element, configured to heat one or more portions of the actuation liquid and generate a temperature gradient within said actuation liquid;
   wherein said elastic sheet is selected from: (i) a sheet characterized by $E*h^3$ having a value of $10^{-13}$ to $10^{-9}$ N*m, wherein "E" is Young's modulus of said membrane, and "h" is a thickness of said membrane; and (ii) a sheet in fluid communication with said actuating liquid and is configured to deform in response to a flow of said actuating liquid.

18. A method comprising the steps of:
   (a) providing a device having:
      (i) at least one substrate;
      (ii) a ceiling;
      (iii) one or more flow channels disposed between said substrate and said ceiling and containing an actuation liquid; and
      (iv) one or more recesses distributed throughout at least said substrate and open to said flow channel and containing a fluid;
   wherein 50% to 80% of the flow channel liquid-substrate interface, interfaces with said fluid within said recesses, and
   (b) providing thermal energy to a portion of said actuation liquid so as to establish a temperature gradient to said actuation liquid, thereby generating pressure distribution or a velocity field in the actuation liquid;

wherein said ceiling has an elastic film, and wherein said pressure distribution of said actuating liquid deforms a defined region of said elastic film upon providing thermal energy.

* * * * *